US011952812B2

(12) United States Patent
Zafeirakis et al.

(10) Patent No.: US 11,952,812 B2
(45) Date of Patent: Apr. 9, 2024

(54) CONTACT-MINIMIZING DOOR OPENING AND CLOSING SYSTEM

(71) Applicants: Nikolaos Zafeirakis, Glyfada (GR); Eleni Zafeirakis, Glyfada (GR)

(72) Inventors: Nikolaos Zafeirakis, Glyfada (GR); Eleni Zafeirakis, Glyfada (GR)

( * ) Notice: Subject to any disclaimer, the term of this patent is extended or adjusted under 35 U.S.C. 154(b) by 791 days.

(21) Appl. No.: 16/901,768

(22) Filed: Jun. 15, 2020

(65) Prior Publication Data

US 2020/0399939 A1 Dec. 24, 2020

Related U.S. Application Data

(60) Provisional application No. 62/989,152, filed on Mar. 13, 2020, provisional application No. 62/863,970, filed on Jun. 20, 2019.

(51) Int. Cl.
*E05C 1/12* (2006.01)
*E05B 1/00* (2006.01)
(Continued)

(52) U.S. Cl.
CPC ................ *E05C 1/12* (2013.01); *E05B 55/00* (2013.01); *E05F 1/12* (2013.01);
(Continued)

(58) Field of Classification Search
CPC ............. Y10S 292/163; Y10S 292/172; Y10S 292/142; Y10S 292/279; Y10S 292/04; E05B 63/18; E05B 63/185; E05B 63/20; E05B 1/0038; E05B 1/0053; E05B 9/02; E05B 13/103; E05B 13/105;
(Continued)

(56) References Cited

U.S. PATENT DOCUMENTS 1,136,141 A * 4/1915 Kelley ................ E05B 65/1066 49/141
1,137,195 A * 4/1915 Donald ................... E05B 55/00 16/86 A
(Continued)

FOREIGN PATENT DOCUMENTS

CA 2776280 A1 * 11/2013 ............... A61L 2/26
CN 1308176 A * 8/2001 ............. E05B 65/08
(Continued)

OTHER PUBLICATIONS

EP3348764A1 Espacenet machine translation description and claims Jan. 2017 (Year: 2023).*

*Primary Examiner* — Victor D Batson
*Assistant Examiner* — Steven A Tullia
(74) *Attorney, Agent, or Firm* — DP IP GROUP; Franco S. De Liguori

(57) ABSTRACT

A contact-minimizing door opening and closing system for a door has a handle including a shaft with an endplate disposed on the shaft opposite the handle and a latch bolt including a pin positioned to contact the endplate. The pin prevents movement of the handle when the latch bolt is extended from a lock housing, and allows movement of the handle when the latch bolt is retracted into the lock housing. An engaging and disengaging mechanism couples the handle to a locking pin such that movement of the handle is configured to operate the engaging and disengaging mechanism to lock the door.

59 Claims, 35 Drawing Sheets

(51) Int. Cl.
*E05B 55/00* (2006.01)
*E05F 1/12* (2006.01)

(52) U.S. Cl.
CPC . *E05B 2001/0076* (2013.01); *E05Y 2201/702* (2013.01); *E05Y 2201/716* (2013.01)

(58) Field of Classification Search
CPC .. E05B 15/0053; E05B 63/22; E05B 65/0042; E05B 65/005; E05B 55/00; E05B 2001/0076; E05B 13/00; E05B 13/002; E05B 13/005; E05B 65/1066; E05F 15/50; E05F 15/53; E05F 15/70; E05F 1/12; E03D 5/092; E03D 5/094; E03D 5/10; E03D 5/105; E03D 5/06; E03D 5/02; E03D 9/04; E03D 9/05; E03D 9/052; E05C 1/08; E05C 1/14; E05C 1/12; E05Y 2201/702; E05Y 2201/716; Y10T 292/097; Y10T 292/0969; Y10T 292/0993; Y10T 292/0995; Y10T 292/307; Y10T 292/098; Y10T 292/0908
USPC .......... 292/92, 163, 172, 142, 279, 4; 16/49, 16/51, 71, 72, 73
See application file for complete search history.

(56) References Cited

U.S. PATENT DOCUMENTS

| | | | | | | |
|---|---|---|---|---|---|---|
| 1,313,920 | A | * | 8/1919 | Schlage | E05B 55/005 | 292/169.21 |
| 1,512,986 | A | * | 10/1924 | Hurd | E05B 55/00 | 70/486 |
| 1,555,830 | A | * | 10/1925 | Carroll | E05B 65/1066 | 70/DIG. 73 |
| 1,605,989 | A | * | 11/1926 | Rucker | E05B 65/1073 | 292/164 |
| 2,056,537 | A | * | 10/1936 | Schatzlein | E05B 65/1066 | 292/341.17 |
| 2,212,316 | A | * | 8/1940 | Edwards | E05B 65/1066 | 70/151 R |
| 2,221,529 | A | * | 11/1940 | Schoenheit | E05B 77/46 | 292/DIG. 3 |
| 2,281,317 | A | * | 4/1942 | McFarlane | E05B 85/22 | 292/164 |
| 2,505,190 | A | * | 4/1950 | Kulbersh | E05B 65/1066 | 292/152 |
| 2,507,289 | A | * | 5/1950 | Williams | E05C 1/14 | 292/167 |
| 3,087,323 | A | * | 4/1963 | Foster | E05B 65/1066 | 70/92 |
| 3,112,945 | A | * | 12/1963 | Maynard | E05C 1/12 | 292/357 |
| 3,156,493 | A | * | 11/1964 | Griffiths | E05C 19/022 | 292/164 |
| 3,339,959 | A | * | 9/1967 | Krantz | E05B 17/0008 | 292/254 |
| 3,518,854 | A | * | 7/1970 | Krantz | E05C 1/14 | 292/254 |
| 3,672,714 | A | * | 6/1972 | Schultz | E05B 59/00 | 292/336.5 |
| 3,862,773 | A | * | 1/1975 | Bisbing | E05C 19/022 | 292/DIG. 4 |
| 3,917,329 | A | * | 11/1975 | Fujiki | E05B 55/00 | 70/141 |
| 3,999,411 | A | * | 12/1976 | Kambic | E05B 55/00 | 70/144 |
| 4,249,761 | A | * | 2/1981 | Nishimura | E05C 19/165 | 292/332 |
| 4,270,781 | A | * | 6/1981 | Nishimura | E05C 19/165 | 292/DIG. 4 |
| 4,658,664 | A | * | 4/1987 | Jacobs | E05C 1/16 | 292/172 |
| 4,725,085 | A | * | 2/1988 | Hu | E05B 55/00 | 292/1.5 |
| 4,896,144 | A | * | 1/1990 | Bogstad | G08B 21/245 | 340/691.6 |
| 5,092,637 | A | * | 3/1992 | Miller | E05B 17/0037 | 292/DIG. 72 |
| 5,401,067 | A | * | 3/1995 | Kurosaki | E05C 5/00 | 292/DIG. 4 |
| 5,469,723 | A | * | 11/1995 | Litwin | E05B 55/00 | 70/387 |
| 5,518,282 | A | * | 5/1996 | Sawada | E05B 17/2011 | 292/252 |
| 5,730,478 | A | * | 3/1998 | D'Hooge | E05C 1/14 | 292/357 |
| 6,045,169 | A | * | 4/2000 | Frolov | E05B 63/202 | 292/335 |
| 6,354,121 | B1 | * | 3/2002 | Frolov | E05B 47/0692 | 292/164 |
| 7,273,240 | B2 | * | 9/2007 | Migli | E05C 19/165 | 292/332 |
| 9,271,611 | B2 | * | 3/2016 | Stratmann | E05F 15/70 | |
| 10,017,968 | B2 | * | 7/2018 | Seibt | B64C 1/1407 | |
| 10,529,219 | B2 | * | 1/2020 | Herdt | G08B 25/10 | |
| 2003/0141722 | A1 | * | 7/2003 | Smith | E05C 1/12 | 292/143 |
| 2007/0256362 | A1 | * | 11/2007 | Hansen | E05F 15/75 | 49/32 |
| 2011/0047876 | A1 | * | 3/2011 | Houser | A47K 5/06 | 49/70 |
| 2012/0023824 | A1 | * | 2/2012 | Mason | E05F 15/622 | 49/340 |
| 2016/0032622 | A1 | * | 2/2016 | Shin | E05B 63/08 | 292/145 |
| 2017/0074010 | A1 | * | 3/2017 | Olson | E05B 1/0053 | |

FOREIGN PATENT DOCUMENTS

| | | | | | |
|---|---|---|---|---|---|
| CN | 101907845 | A | * | 12/2010 | E05F 1/12 |
| CN | 108894622 | A | * | 11/2018 | E05B 15/0006 |
| CN | 112922484 | A | * | 6/2021 | E05D 7/0009 |
| DE | 10001424 | A1 | * | 7/2000 | E05F 1/12 |
| DE | 10100967 | A1 | * | 7/2002 | E05B 15/101 |
| DE | 10119978 | B4 | * | 2/2005 | E05B 53/001 |
| DE | 202011000362 | U1 | * | 9/2011 | A47B 88/0477 |
| DE | 202012012523 | U1 | * | 6/2013 | E05B 13/002 |
| DE | 202015004163 | U1 | * | 8/2015 | E05B 1/0053 |
| EP | 1367199 | A1 | * | 12/2003 | E05B 15/101 |
| EP | 2716847 | A2 | * | 4/2014 | E05B 63/202 |
| EP | 3348764 | A1 | * | 7/2018 | E05F 1/10 |
| EP | 3660247 | A1 | * | 6/2020 | E05C 19/024 |
| GB | 2458118 | A | * | 9/2009 | G07C 11/00 |
| JP | H09228715 | A | * | 2/1996 | E05C 19/022 |
| JP | 2003343141 | A | * | 12/2003 | E05C 1/14 |
| JP | 2016108912 | A | * | 6/2016 | E05F 3/10 |
| KR | 910004711 | Y1 | * | 5/1987 | E05D 5/04 |
| KR | 20130036419 | A | * | 10/2011 | E05F 3/02 |
| KR | 20180062760 | A | * | 12/2016 | E05F 1/12 |
| KR | 101756197 | B1 | * | 2/2017 | E05F 3/102 |
| KR | 20180098828 | A | * | 2/2017 | E05F 1/12 |
| KR | 20200048851 | A | * | 10/2018 | E05D 7/0018 |
| NL | 7811334 | A | * | 5/1980 | E05B 13/002 |
| WO | WO-2005118988 | A1 | * | 12/2005 | E05B 55/00 |
| WO | WO-2007044728 | A1 | * | 4/2007 | E05B 63/20 |
| WO | WO-2008056573 | A1 | * | 5/2008 | E05C 1/14 |
| WO | WO-2012016108 | A2 | * | 2/2012 | E05F 1/1066 |
| WO | WO-2013049899 | A1 | * | 4/2013 | E05B 63/22 |
| WO | WO-2019012316 | A1 | * | 1/2019 | |
| WO | WO-2020245558 | A1 | * | 12/2020 | E05B 17/2007 |

* cited by examiner

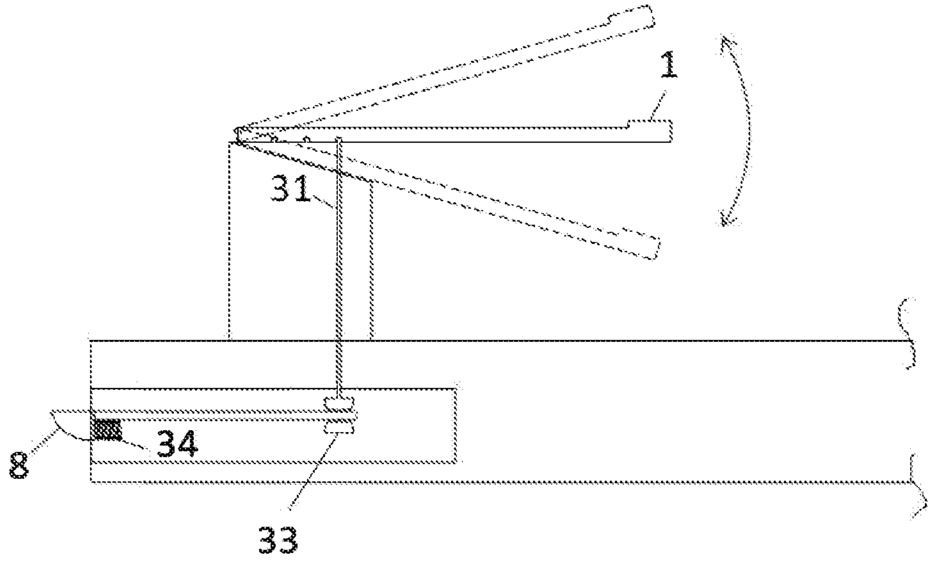
FIG. 8
FIG. 9A
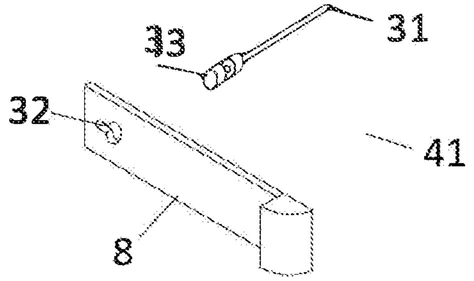
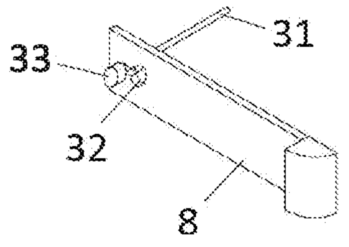
FIG. 9B
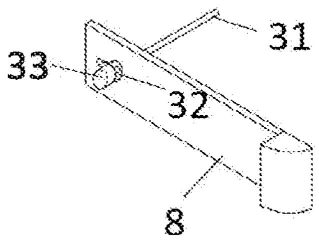
FIG. 9C

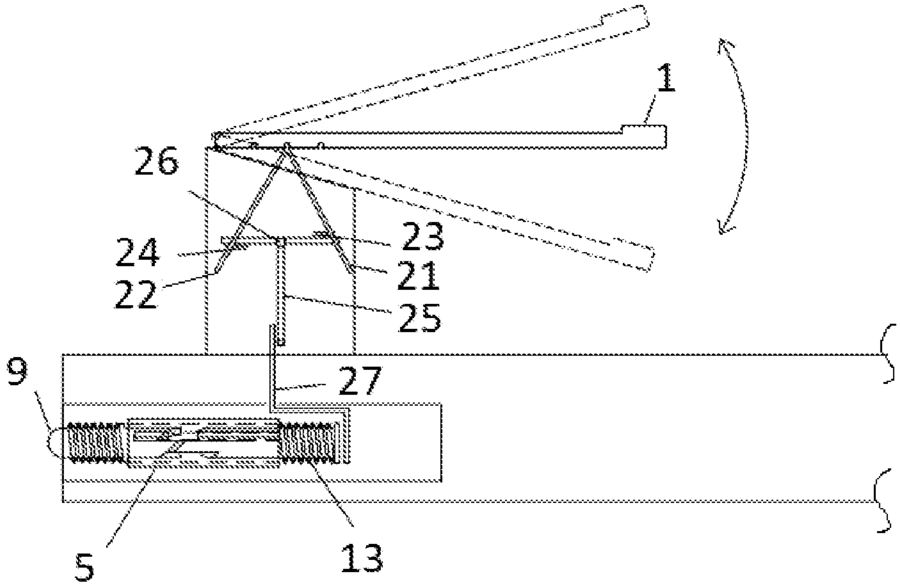
FIG. 10
FIG. 11A
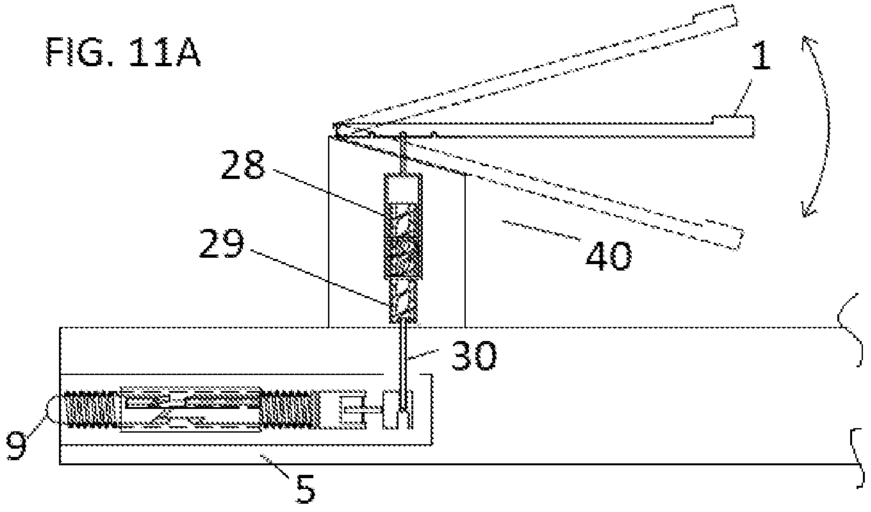
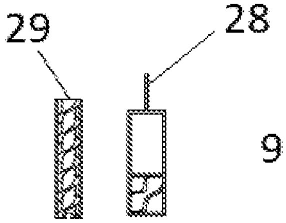
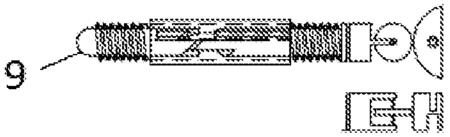
FIG. 11B
FIG. 11C

FIG. 47A
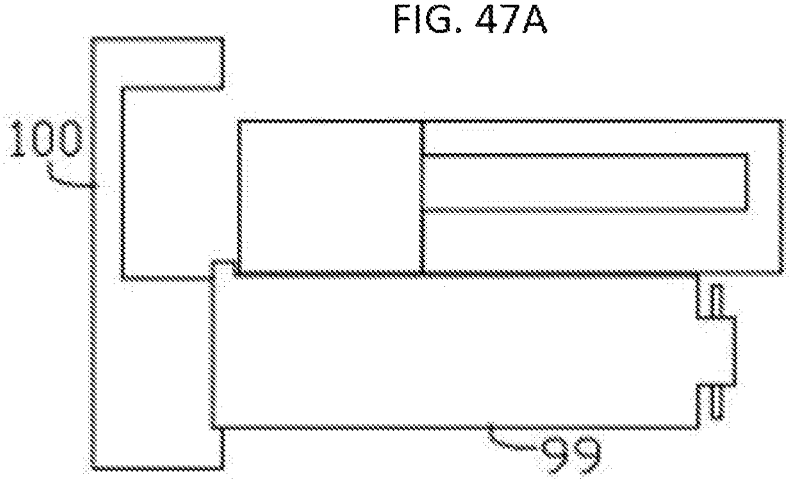
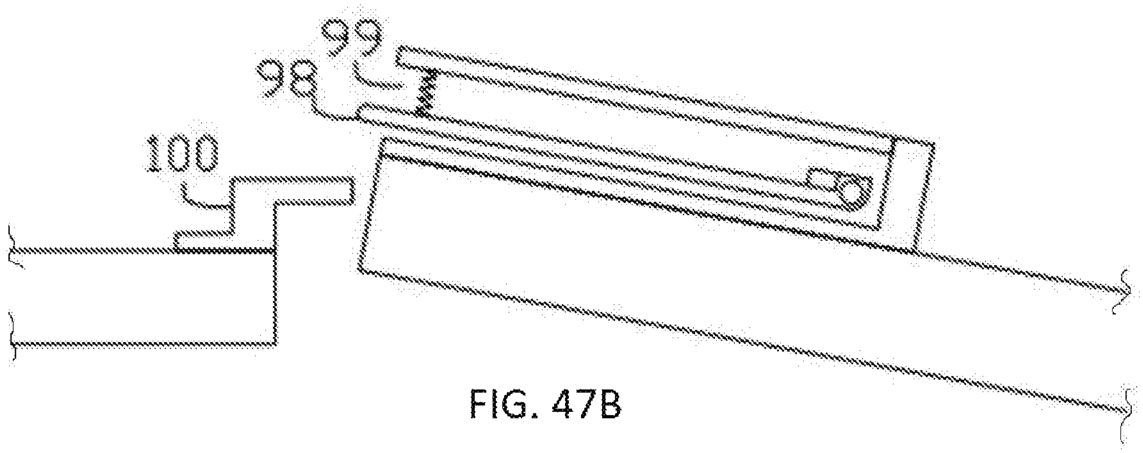
FIG. 47B
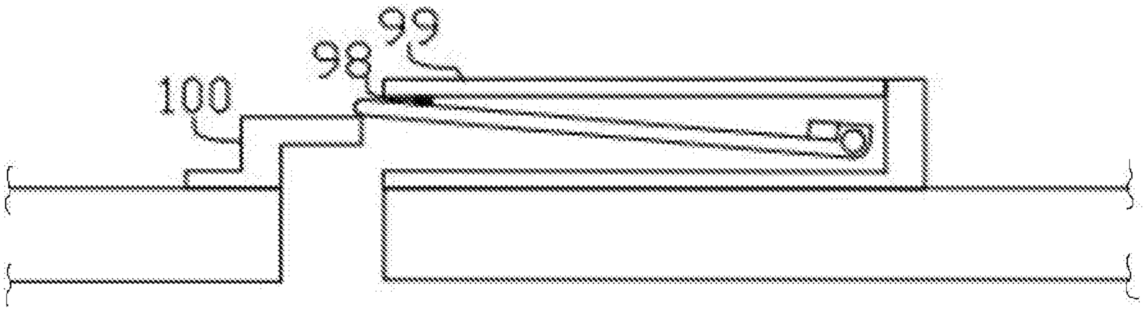
FIG.47C

CONTACT-MINIMIZING DOOR OPENING AND CLOSING SYSTEM

RELATED APPLICATIONS

The instant application claims priority to U.S. Provisional Patent Application Nos. 62/863,970, filed on Jun. 20, 2019, and 62/989,152, filed Mar. 13, 2020, both incorporated herein by reference in their entirety.

BACKGROUND

Technical Field

The present disclosure relates to the field of manufacture techniques, and in particular to the field of doors and more particularly to the field of door opening and closing mechanisms. Still more particularly, the present disclosure relates to manual door control mechanisms for opening, closing and locking doors.

Description of Related Art

Doors in public spaces, and especially doors of public restrooms, door handles and locks are bacterial and viral concentration points that can easily spread infections to individuals that come in contact with the door handles. For example, Coronavirus disease 2019 (COVID-19), caused by severe acute respiratory syndrome coronavirus 2 (SARS-CoV-2), is suspected of being transmissible by contact with surfaces. In the majority of typical doors, an individual has to catch the knob with the palm and fingers to rotate it. In such a situation, microbes on the individual's hand can be deposited on the door knob and any microbes present on the door knob can be transferred to the individual's hand. In the current situation, the individual must make three consecutive moves in order to close and lock the door. The individual first needs to push the door towards the casing, rotate the knob to move the latch bolt and then lock with the existing system (latch, key, etc.). This complex procedure forces the individual to come into contact with the door and corresponding locking accessories. The individual needs to follow the same procedure in reverse in order to open the door. As a result, individuals are forced to wash their hands more often than necessary. However, even prior to the COVID-19 pandemic, many individuals felt uncomfortable touching door handles in public spaces, especially public toilets.

Therefore, it is desirable to provide contact-minimizing door opening and closing systems which overcome the foregoing drawbacks with existing door opening and closing systems and related problems.

SUMMARY

It is therefore an object of the present invention to advantageously overcome the aforementioned drawbacks and shortcomings of the prior art by providing a contact-minimizing door opening and closing system designed to pull or push open most public doors found in stores, public parks, offices, public bathrooms (toilets), etc., while minimizing contact with potentially germ and virus infected surfaces of the doors.

It is a further object of the present invention to provide a contact-minimizing door opening and closing system having a dual-use knob as it acts both as a handle for opening and closing the door and as a locking lever thereof.

It is a further object of the present invention to provide a contact-minimizing door opening and closing system which does not have a key, as it is not required since the door locks only when someone is inside.

It is a further object of the invention to provide a contact-minimizing door opening and closing system, its handle providing the same effect on the locking mechanism, either pushing or pulling it.

It is a further object of the invention to provide a contact-minimizing door opening and closing system, its handle having a shape which does not require that the individual touches it with the fingers or the palm, but allows exerting pressure on it by any part of the body.

To achieve the foregoing and other objects of the present disclosure, in one exemplary embodiment, the contact-minimizing door opening and closing system is configured so that an individual does not need to use the palm of his hand and/or fingers as the number of moves required to secure the door locking is limited. Essentially, the only move the individual needs to make is to push the doorknob constantly until it reaches the closed position, in general to close the door by pushing it with any part of the individual's body. In this position, pressing the knob also causes the door to lock as the locking mechanism is designed to perform the rest of the movements.

Another object of the invention is to provide a contact-minimizing door opening and closing system that does not have a handle on the outer side of the door, since the door remains permanently open after the individual comes out of the toilet, indicating the availability of the toilet to the next visitor.

It is also an object of the present invention to provide a contact-minimizing door opening and closing system operating in combination with a mechanism which repels the door from the casing by pushing it to an open position when it is not locked.

It is also an object of the present invention to provide a contact-minimizing door opening and closing system having a security device that prevents incorrect locking when the room is empty. Locking can only be achieved when the door is closed and the handle inside the room is pushed.

A further feature of the invention may be that the security mechanism provided by the system holds the handle in a fixed position when the door is open. Once the door is closed, the security mechanism releases the handle, allowing it to move and turning it into a locking mechanism element. This feature ensures that it is impossible to lock an empty toilet.

A further feature of the invention is that the sequential locking and unlocking mechanism is coupled to two movable parts, first the latch bolt that retracts when it meets the metal plate on the casing and second the locking pin. This ensures that the door is unable to lock when the toilet is empty.

Still a feature of the invention is that it does not allow unlocking the door from outside the toilet. This provides a sense of security to the individual of the site.

In addition, according to an illustrative embodiment of the invention, the plate on the casing has only one bore, since the latch bolt of the system does not enter the door casing.

Still another feature of the invention is that the handle has large dimensions so that the force exerted by the individual upon it is distributed over a large surface, reducing the pressure so as not to cause discomfort to the body part exerting the force.

Yet another feature of the invention is the combination of an automatic door opening mechanism with a mechanism for automatically activating the room lighting, ventilation of the space or even activating the toilet cistern, without additional individual interaction.

According to an aspect of the present invention, a contact-minimizing door opening and closing system comprises: a handle; a handle stabilization mechanism coupled to the handle at a first end and coupled to a latch bolt at a second end, the stabilization mechanism configured to control movement of the handle in response to a position of the latch bolt; and an engaging and disengaging mechanism coupling the handle to a locking pin, actuation of the handle configured to operate the engaging and disengaging mechanism to lock the door.

According to another aspect of the present invention, a contact-minimizing door opening and closing system comprises: a handle having a shaft with an endplate disposed on the shaft opposite the handle; a latch bolt including a pin positioned to contact the endplate, the pin preventing movement of the handle when the latch bolt is extended from a lock housing, and allowing movement of the handle when the latch bolt is retracted into the lock housing; and an engaging and disengaging mechanism coupling the handle to a locking pin, movement of the handle configured to operate the engaging and disengaging mechanism to lock the door.

In yet another aspect, the present invention is directed to a method for locking and unlocking a door with minimal contact, the method comprising: mounting a handle to a door, the handle coupled to an engaging and disengaging mechanism; unlocking movement of the handle by compressing a latch bolt; extending a locking pin coupled to the engaging and disengaging mechanism into a receptacle formed on the strike plate in response to the latch bolt being compressed against the strike plate; and retracting the locking pin from the receptacle in response to a translational force exerted on the handle by an individual.

These and other objects, features, aspects and advantages of the invention will become apparent in the following detailed description.

BRIEF DESCRIPTION OF THE DRAWINGS

These and other features, aspects and advantages of the present disclosure will become better understood with regard to the following description, appended claims and accompanying drawings wherein:

FIG. 8 shows the handle stabilizing mechanism.

FIGS. 9A, 9B and 9C show the various positions of the handle stabilizing mechanism.

FIG. 10 shows another alternative embodiment of the handle motion conversion mechanism with rods.

FIGS. 11A, 11B and 11C further illustrate an alternative embodiment of the handle motion conversion mechanism by using a worm screw.

FIGS. 47A, 47B and 47C show a way to prevent locking when the door is open.

DETAILED DESCRIPTION

Exemplary embodiments of the contact-minimizing door opening and closing system according to the present invention will be described with reference to the accompanying drawings.

The contact-minimizing door opening and closing system (also referred to herein as “system” or “door opening and closing system”) according to the present invention is configured for use with most public doors found in stores, public parks, offices, public bathrooms (toilets), etc., while minimizing contact with potentially germ and virus infected surfaces of the doors.

Figure 1A:
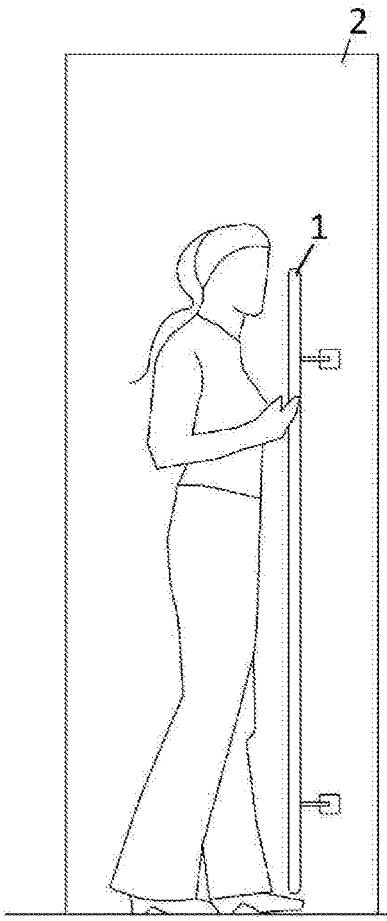
FIGS. 1A and 1B respectively show a door with a knob moved by pressure or traction and a door with a vertical bar to press by means of any member of the body, in accordance with a contact-minimizing door opening and closing system of the present invention.

Referring to FIG. 1A, the contact-minimizing door opening and closing system includes a handle 1 which is always on the inner side of a door 2. According to the present invention, an outer side of the door 2 is not provided with any handle or any kind of knob.

According to an exemplary feature of the present invention, the outer side of the door 2 may be provided with or have a decorative and/or informative construction to convey information to a user of the room or space with which the door with the door opening and closing system is associated. In an exemplary embodiment, the outer side of the door 2 may be provided with a sign made of a material that changes color or provides different messages when seen from various angles to inform someone whether the room is available for use or not. For example, depending on the viewing angle, the sign may show or reflect a green color to indicate that the room is available for use (i.e., is not occupied), or it may show or reflect a red color to indicate that the room is not available for use (i.e., is occupied). Alternatively, the sign may be designed so that it reflects a green color from all angles to show that the door is open and the room available for use, and so that the sign reflects a different color or shows a symbol representing that the room is not available for use when viewed by someone positioned in front of the door (i.e., when the sign is not viewed at an angle).

The individual uses the handle 1 both to close and lock the door 2, as well as to unlock and open door 2. The handle 1 does not rotate, but rather, is pulled and/or pushed to induce a pivoting motion, as shown in FIG. 2. The handle 1 moves on an axis parallel to the door surface 2 and not perpendicular to it, as with conventional handles. The handle 1 can be installed at a position proximate to an edge of the door 2 that is opposite to hinges holding the door 2 to a door frame. Advantageously, the handle 1 may extend along the surface of the door 2, in the form of a bar, perpendicularly to the ground. Consequently, force can be exerted on the handle 1 by any part of the body without contact by hands. For example, an individual can actuate the handle 1 to engage/disengage a lock 7 (shown in FIG. 1B) by applying force to the handle 1 using an elbow, a foot, a hip, etc. Thus, some embodiments allow an individual to avoid spreading germs. In embodiments of the present invention, the lock 7 can be locked or unlocked by the application to the handle of a single force in a single direction.

Figure 5:
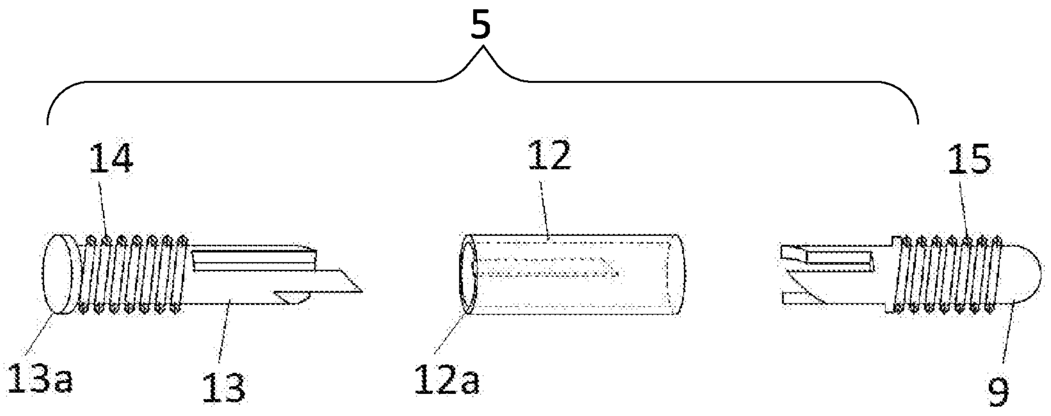
FIG. 5 is an exemplary embodiment of the sequential engaging and disengaging mechanism for locking and unlocking.

Turning to FIG. 2, the handle 1 is mounted onto the door 2 by means of mounting hardware, such as screws 3, for example. The lock actuating mechanism is enclosed in a shell 4. The handle 1 can be pulled and pushed, as indicated by the dashed lines in FIG. 2, both motions producing essentially the same effect. A return spring 6 inside the shell 4 returns the handle 1 to a neutral position when released by the individual. The handle 1 can perform two functions/operations. A first operation involves pushing and pulling the door 2 open and closed. A second operation involves unlocking and locking the door 2. Each operation can be sequentially activated by the handle 1. In an embodiment, operating the door opening and closing system includes cooperation between three mechanisms, namely a handle stabilizing mechanism 41 (FIG. 8), a handle motion conversion mechanism 40 (FIG. 6), and a sequential engaging and disengaging mechanism 5 (FIG. 5). While implementations of the three mechanisms are described hereinbelow, it is understood that the three mechanisms can be implemented using other structures and configurations.

Figure 1B:
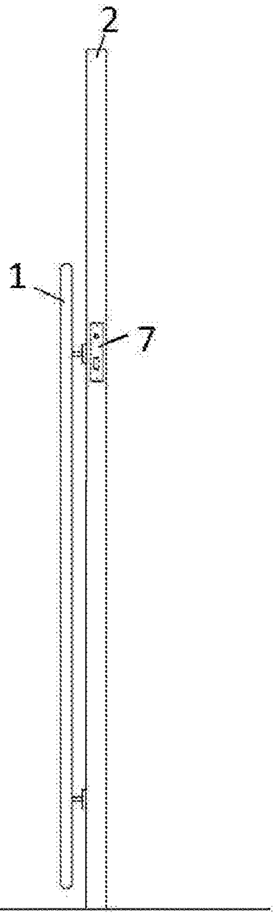
Figure 2:
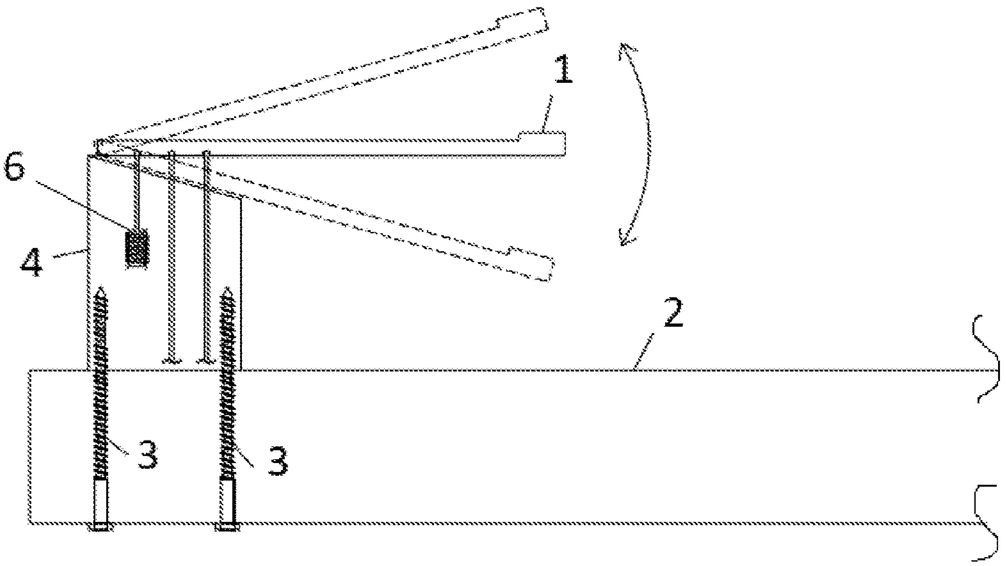
FIG. 2 is a plan view of the handle of the door and shows its mode of operation, i.e. the different positions of the handle in a locking mechanism of the door opening and closing system of the invention.
Figure 3:
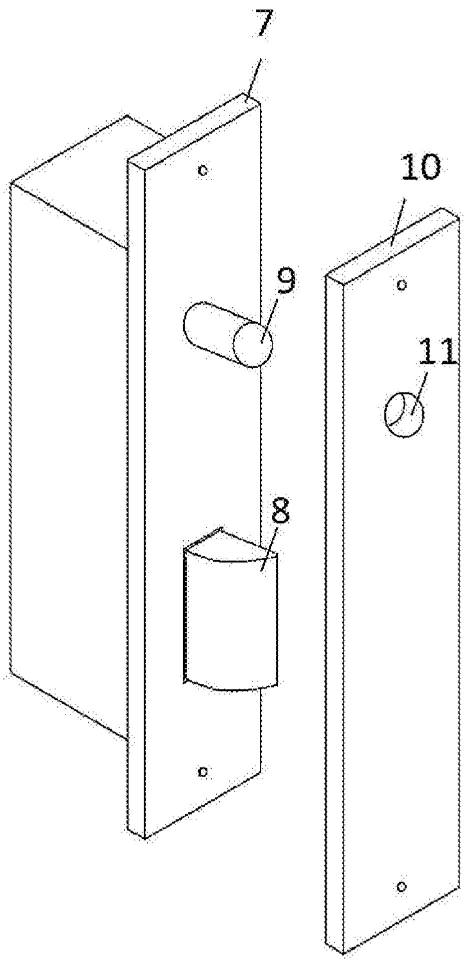
FIG. 3 illustrates the locking mechanism, which is compatible with the existing locks, and in which the latch bolt and the pin may be in a separate position.
Figure 4A:
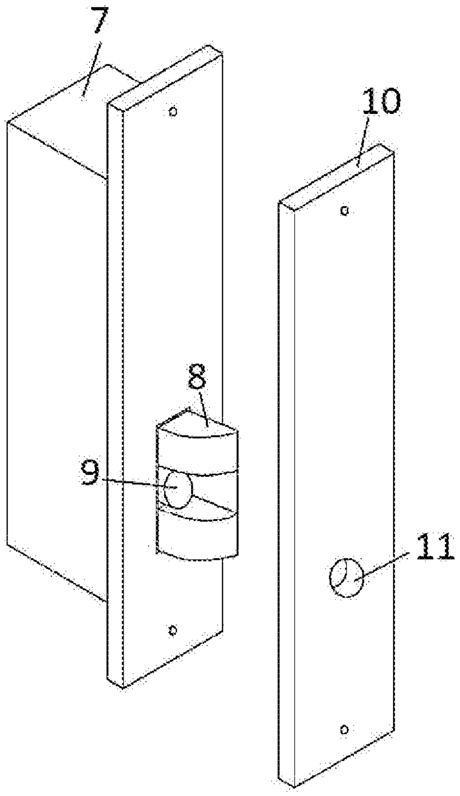
FIGS. 4A and 4B show an alternative embodiment of the locking mechanism in an open and closed position by placing a pin inside the bolt.
Figure 4B:
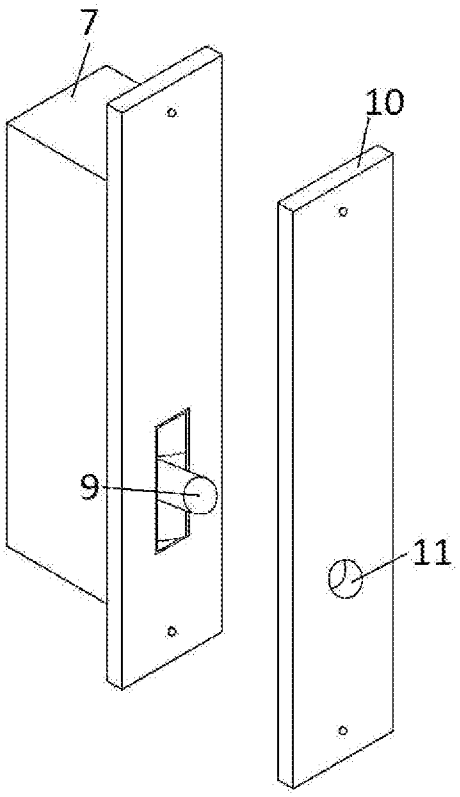

The handle 1 is connected with the lock 7, shown in FIG. 1B, located on the door 2. The lock 7 has a latch bolt 8 and a pin 9, as shown in FIG. 3. In a resting state, the latch bolt 8 extends outwardly while the pin is within the lock 7. In an embodiment, the latch bolt 8 can accommodate the pin 9, as shown in FIG. 4A, thus reducing the overall size of the lock 7. The latch bolt 8 and the pin 9 move independently. Opposite the lock 7 and on the door frame there is a metal strike plate 10. The metal strike plate 10 includes a hole 11 directly opposite the pin 9. When closing the door 2, the latch bolt 8 retracts when contacting the metal strike plate 10 and remains within the lock 7. Respectively, the pin 9 is pushed out by sequential engaging and disengaging mechanism 5 (see FIG. 5) and enters the hole 11, as shown in FIG. 4B.

In some embodiments, the movement of the handle 1 causes the pin 9 to move when the latch bolt 8 retracts into the lock 7. The sequential engaging and disengaging mechanism 5, in an embodiment, includes a fixed shell 12, shown in FIG. 5, an ejection element 13 and return springs 14, 15 on the ejection element 13 and the pin 9, respectively. The fixed shell 12 can be configured as a cylinder having a through bore extending coaxially along a central axis of the fixed shell 12. The operation of the sequential engaging and disengaging mechanism 5, in an embodiment, operates by pushing the ejection element 13 into the fixed shell 12, the ejection element 13 pushes the pin 9 out of the lock 7 and into the hole 11 of the strike plate 10. The return spring 14 exerts a lateral force between a mount surface 13*a* of the ejection element 13 and a contact surface 12*a* of the fixed shell 12. The lateral force resets the ejection element 13 to its original position. The next push of the ejection element 13, due to the configuration of the sequential engaging and disengaging mechanism 5, allows the pin 9 to come to its original position by means of the return spring 15. In some embodiments, the ejection element 13 includes a first end structured to rotationally eject the locking pin 9, and the locking pin 9 includes a catch structure proximate to the first end of the ejection element 13. The catch structure can be configured to engage with a ridge disposed on an inner surface of the through bore of the fixed shell 12 at first actuations of the handle 1 and disengage from the ridge at second actuations of the handle 1.

Figure 6:
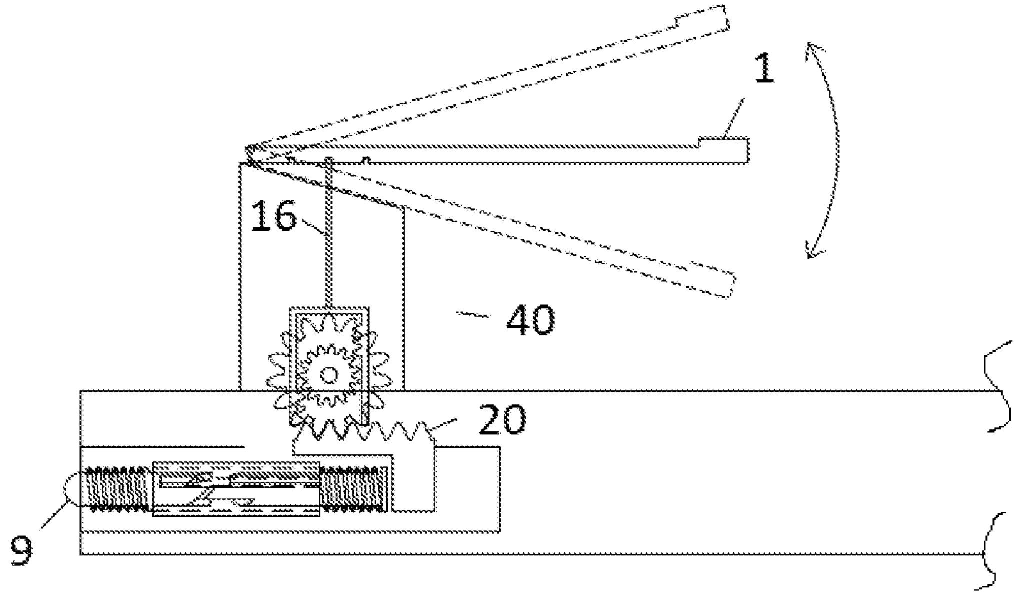
FIG. 6 illustrates the handle motion conversion mechanism with gears, where the motion conversion is intended to turn any displacement of the handle on either side of its equilibrium position after pulling or pushing, into a component motion which always moves in the same direction.
Figure 7:
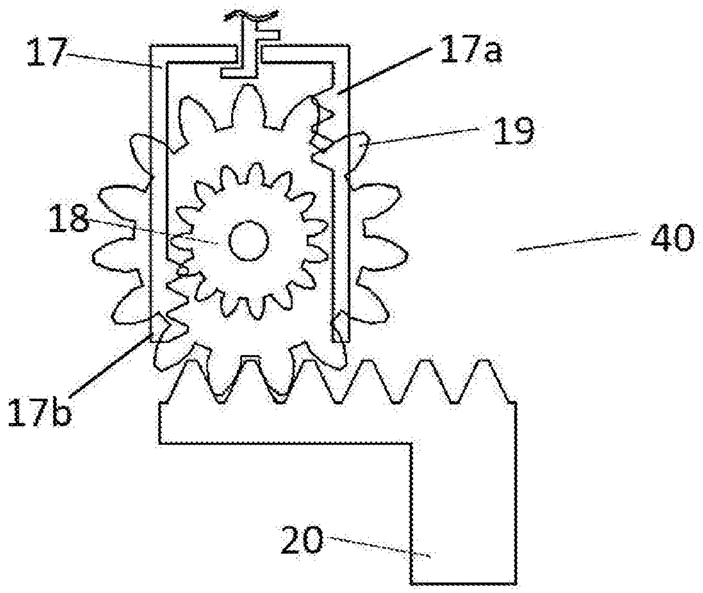
FIG. 7 shows a detail of the handle movement conversion mechanism and in particular the engagement of the gears.

The transfer of movement from the handle 1 to the ejection element 13 can be implemented by means of handle motion conversion mechanism 40 shown in FIG. 6 and FIG. 7. In an embodiment shown in FIG. 6, the gear configuration of the handle motion conversion mechanism 40 is shown where pulling or pushing the handle 1 pulls or pushes a rod 16. The rod 16 is permanently engaged with a cover 17 (shown in FIG. 7). The cover 17 has a first rack 17*a* on the upper part of one leg and a second rack 17*b* on the lower part of the other leg. Consequently, either by pulling or by pushing the handle 1, one of the two racks 17*a*, 17*b* can engage with the pinion gear 18 and rotate it. The large gear 19, coaxially connected with the pinion gear 18, is also set in motion. The large gear 19 can engage with a third gear 20, which when moving pushes the ejection element 13 and transfers the handle 1 motion to the sequential engaging and disengaging mechanism 5. The third gear 20 can be a rack caused to move laterally by the rotation of the large gear 19. In other embodiments, the third gear can be a worm screw that is rotationally driven laterally by the rotation of the large gear 19.

In another embodiment of the handle motion conversion mechanism 40, the motion transfer from the handle 1 to the ejection element 13 takes place by means of rods 21 and 22, shown in FIG. 10, connected to the handle 1. Each rod 21 and 22 also has a corresponding safety 23 and 24, respectively. The rods 21, 22 are in contact with a T-shaped component 25 which rotates clockwise about a shaft 26. Each rotation of the T-shaped component 25 causes the rod 27 to push the ejection element 13. Pulling the handle 1 causes pulling of the rods 21, 22, but only the rod 22, due to the safety 24, will cause the T-shaped component 25 to rotate setting in motion the sequential engaging and disengaging mechanism 5. Similarly, pushing the handle 1 pushes the rods 21, 22 inwards, but only the rod 21, due to the safety 23, allows the T-shaped component 25 to rotate.

In another embodiment, shown in FIG. 11A, the handle motion conversion mechanism 40 includes a worm screw 29 that can be used to move the pin 9. The handle 1 is connected to a sleeve 28. The worm screw 29 is inserted into the sleeve 28 and moves therein. Pulling or pushing the handle 1 causes rotation of the worm screw 29 and via the connecting element 30. The rotational movement of the worm screw 29 is transferred to the ejection element 13 to move the pin 9. FIG. 11B shows an exploded view of the sleeve 28 and worm screw 29. FIG. 11C provides an overhead and side view of the coupler disposed between the engaging and disengaging mechanism 5 and the connecting element 30.

As shown in FIG. 8 and FIG. 9A-9C, operating the sequential engaging and disengaging mechanism 5 in an embodiment includes unlocking the handle 1 by means of handle stabilizing mechanism 41, which allows movement of the handle 1. In an embodiment, unlocking the handle 1 includes retracting the latch bolt 8 within the lock 7. The handle 1 is connected to the latch bolt 8 by a rod 31. The latch bolt 8 has a notch 32 formed at an end portion, into which the rod 31 is inserted. The configuration of the notch 32 is such that the rod 31 engages with and held in the notch 32 by a holding structure 33. When the door 2 is open, the latch bolt 8, due to a return spring 34, protrudes out of the lock 7. FIG. 9A-9C shows more detailed views of the structure and engagement of the notch 32 and the holding structure 33 of the rod 31. Due to the configuration of the notch 32 and rod 31 assembly, movement of the handle 1 is effectively limited when the rod 31 is engaged in the notch 32 as shown in FIG. 9B.

In the embodiment shown in FIG. 8 and FIG. 9A-9C, when the door 2 is closed, the latch bolt 8 is compressed within the lock 7. The compressive movement of the latch bolt 8 moves the notch 32, FIG. 9C and releases the holding structure 33 of the rod 31 joined to the handle 1. With the rod 31 released from the notch 32, the handle 1 can be moved both by pulling and by pushing, allowing the sequential engaging and disengaging mechanism 5 to operate.

Figure 16:
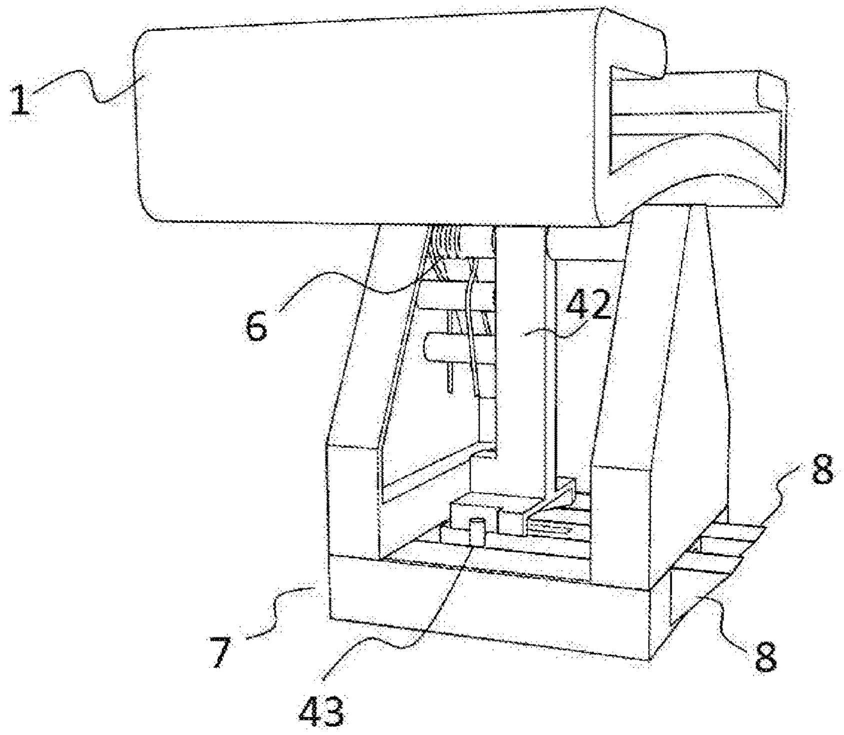
FIG. 16 is an exemplary illustration of the handle with its return spring, latch bolts and the handle shaft.
Figure 17:
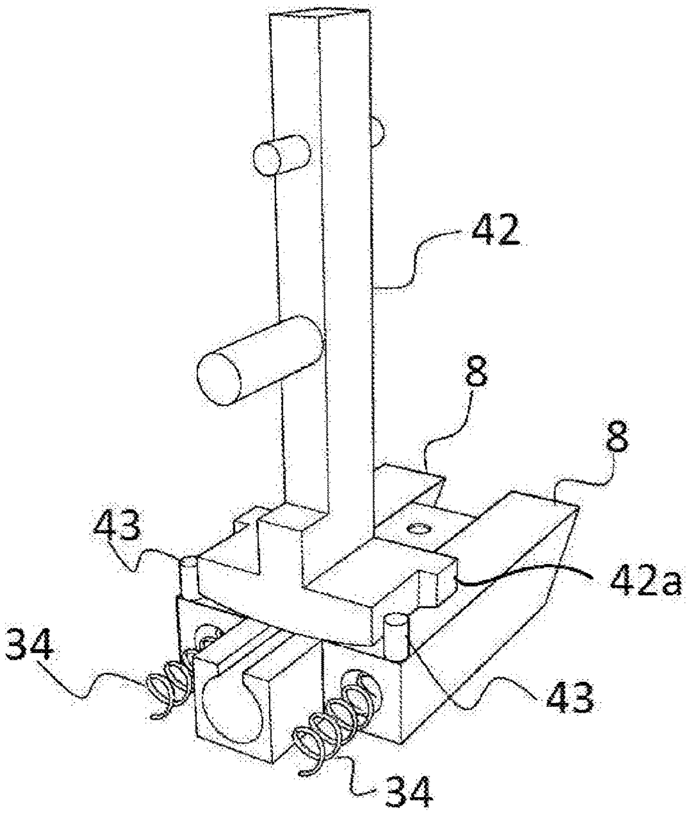
FIG. 17 shows a portion of the handle stabilizing mechanism with its shaft.

In another embodiment, shown in FIG. 16 and FIG. 17, the sequential engaging and disengaging mechanism 5, and the handle stabilizing mechanism 41 of the embodiments described previously, with respect to FIG. 2-11C, can be configured as a single assembly. In the present embodiment, the handle 1 includes a shaft 42 which can be prevented from moving while the latch bolts 8 are extended out of the lock 7 by a pin 43 at the rear of each latch bolt 8. The pin 43 prevents movement of the shaft 42 by contacting an endplate 42*a* of the shaft 42, as shown in FIG. 17. Closing the door 2 can cause the latch bolt 8 to retract within the lock 7, so that the pins 43 are moved beyond the extent of the endplate 42*a*, and thus do not prevent the movement of the shaft 42 and the handle 1. The return of the handle 1, after exerting force in its original position, can be facilitated by a double action return spring 6, for example. Returning the handle 1 to its original position can be accomplished using alternative structures, as well, without deviating from the intent of the present invention. Upon opening the door, springs 34 exert lateral force on the latch bolt 8, causing the latch bolt 8 to extend beyond the lock 7. As a result, the pins 43 can once again contact the endplate 42*a* to prevent motion of the handle 1.

Figure 18:
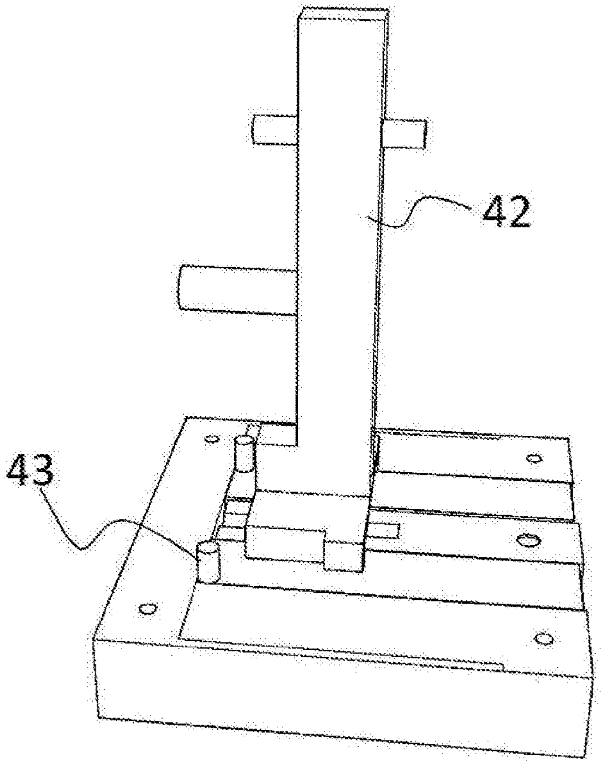
FIG. 18 shows the latch bolts within the lock and the handle shaft released and movable.
Figure 19:
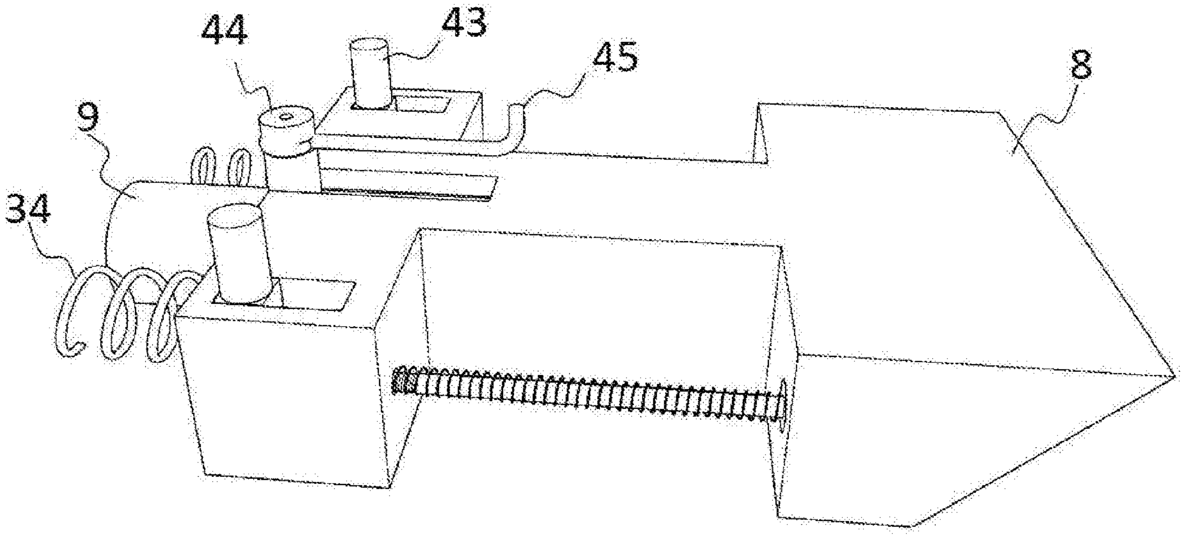
FIG. 19 illustrates a single latch bolt with a built-in pin that has an inverted end.
Figure 20:
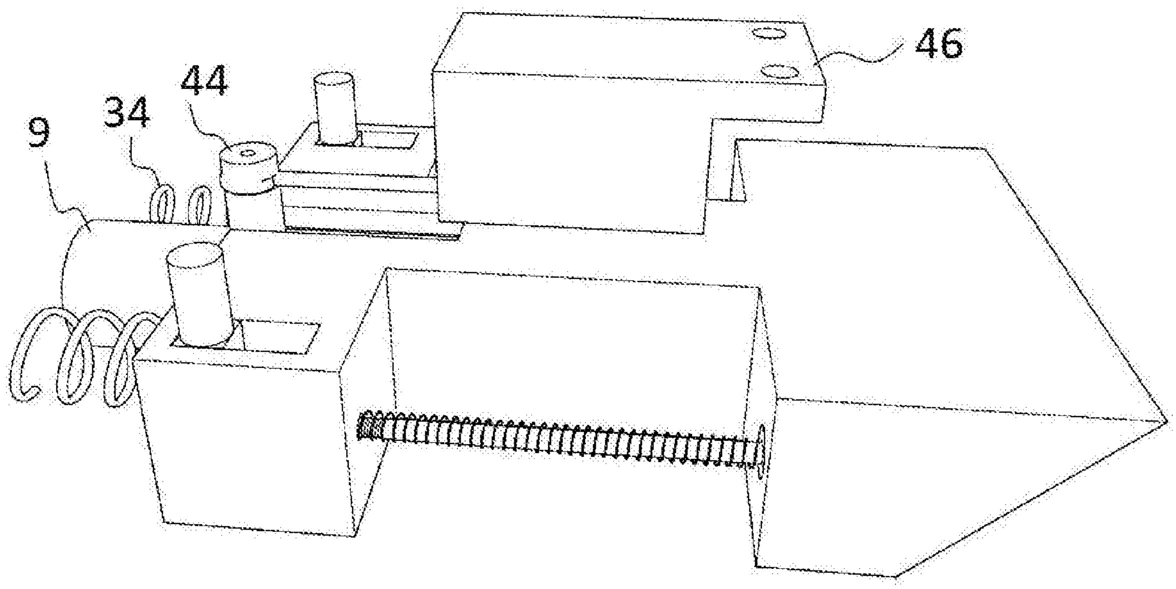
FIG. 20 shows a shell in which the inverted end of the built-in pin moves.
Figure 21:
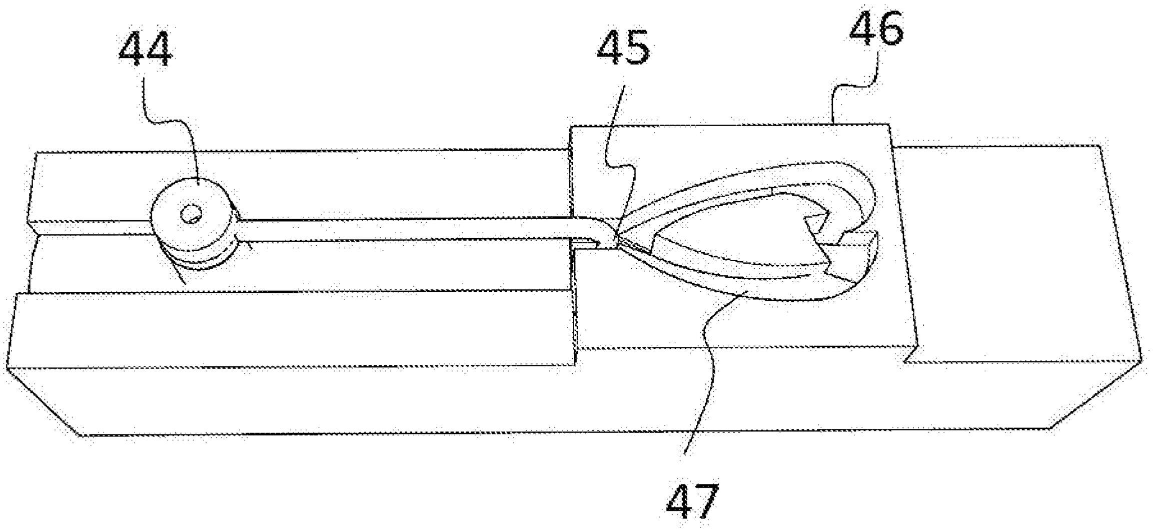
FIG. 21 shows the inverted end within the shell, which carries an embossed channel, defining the end movement.

The same effect as described with respect to FIGS. 16 and 17 can also be achieved with an embodiment shown in FIGS. 18 and 19. In the present embodiment, latch bolt 8, which has two pins 43. A pin 9, intended for locking the door 2, extending out of the central axis of the latch bolt 8. The pin 9 has a protruding member 44. An inverted end 45 extends from the protruding member parallel to a long axis of the pin 9. The inverted end 45 enters a shell 46 (FIG. 20) with an embossed channel, followed by the end when moving. The shell 46 with the embossed channel 47 (FIG. 21) in combination with the inverted end 45, guides the pin 9 movement in each movement of the handle 1, being a variant of the sequential engaging and disengaging mechanism 5. FIG. 21 shows the inverted end 45 in its original position, while switching to the locking position is made by travelling from the upper side of the embossed channel 47 and switching from the locking position to the open position is made by travelling from the underside of the embossed channel 47.

Figure 22:
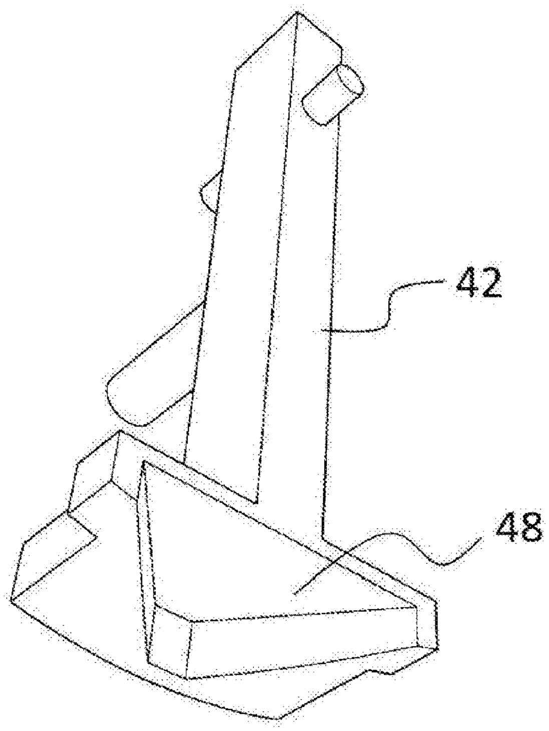
FIG. 22 illustrates the base of the handle shaft with its configuration.
Figure 23:
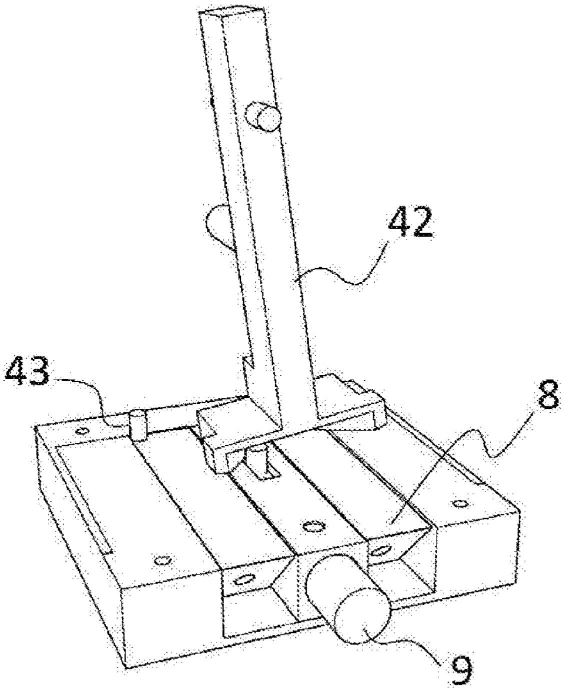
FIG. 23 illustrates the motion of the pivot and how the shape of its base contributes to the ejection of the pin outside the lock.

Turning to FIGS. 22 and 23, the shaft 42 of the handle 1 has, at its base, an endplate 48. The endplate 48 can have a channel formed on an underside that accommodates the protruding vertex 44 of the pin 9. The channel can constrain the movement of the vertex 44 to a defined path. The configuration of the channel formed on the endplate 48, being axially symmetrical, produces the same effect on the movement of the protruding vertex 44 of the pin 9, whether the shaft 42 moves in one direction or the other. This means that regardless of the individual pulling or pushing the handle 1, the resulting action of the pin 9 can be same.

Figure 24:
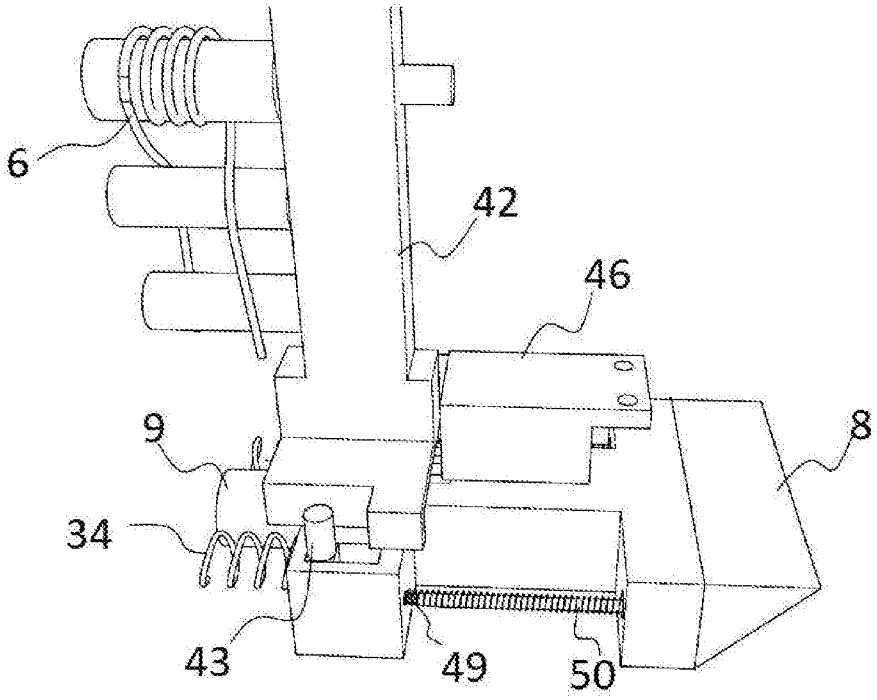
FIG. 24 depicts a part of the system where the latch bolt and the handle shaft, the return spring and the shell of the engaging and disengaging mechanism are evident.
Figure 25:
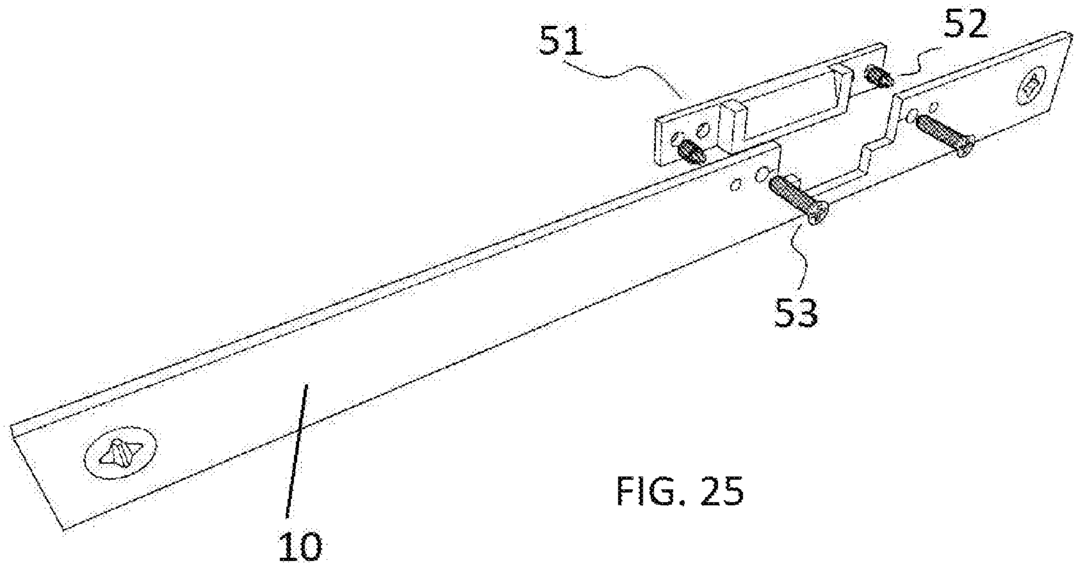
FIG. 25 shows the spacer that fits into the casing and acts as a regulator for properly closing and locking the door.
Figure 26:
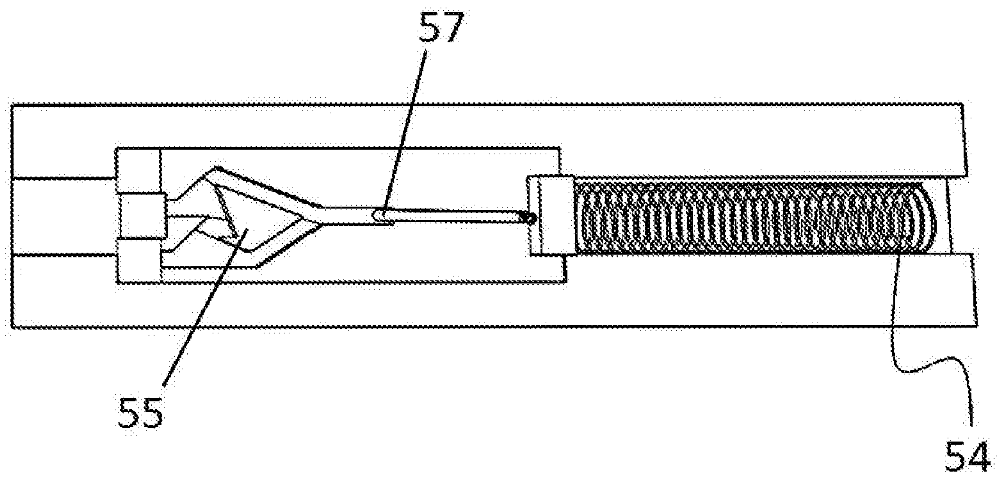
FIG. 26 shows a simplified type of a sequential locking mechanism.
Figure 27:
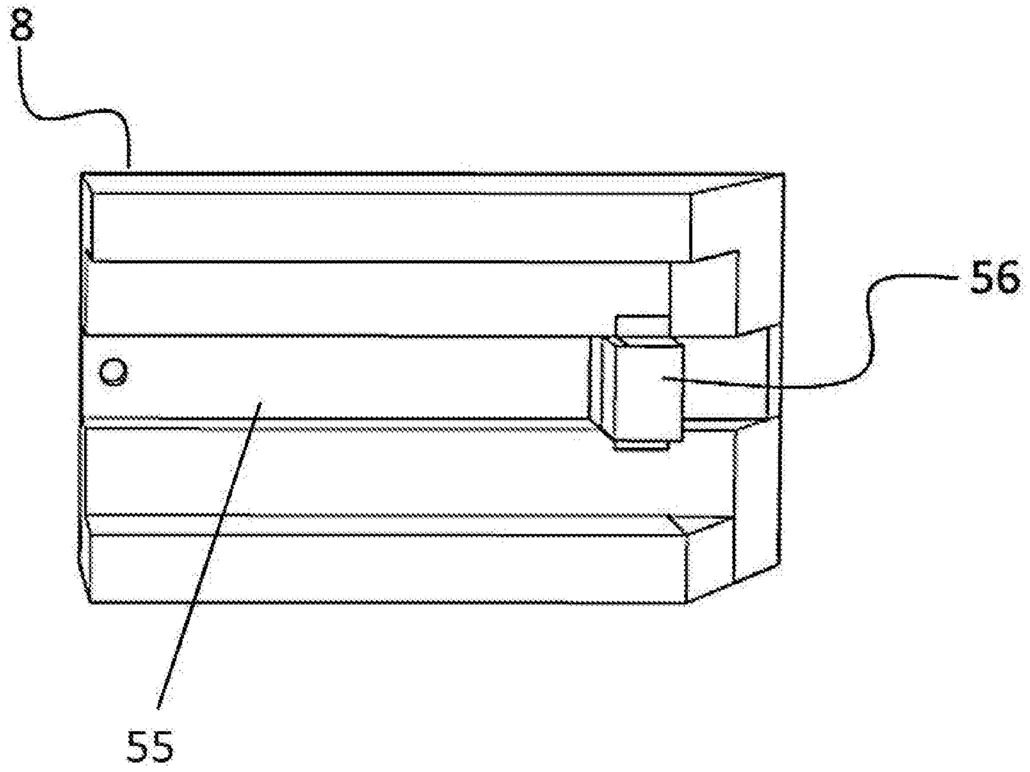
FIG. 27 shows the latch bolt of the sequential mechanism and details of its structure.
Figure 28:
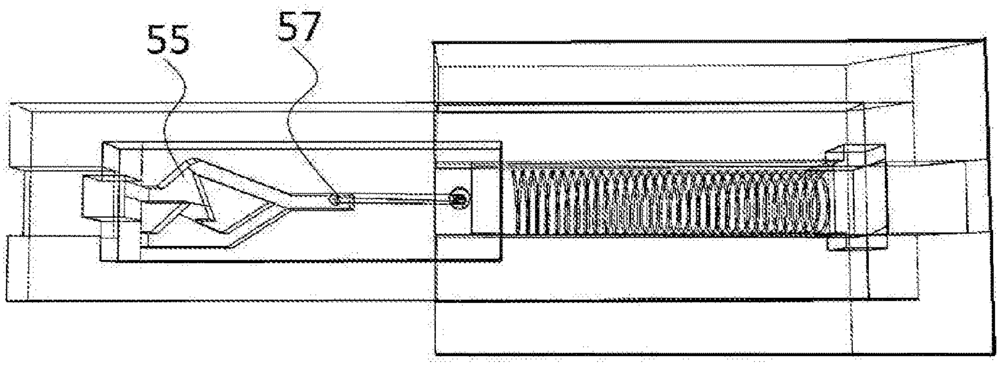
FIG. 28 further depicts an alternative embodiment of the sequential locking mechanism operating in favor of security, by requiring for locking that the handle and the bolt move at the same time, the latter retracting when it comes into contact with the door casing.

Given that the latch bolt 8 retraction range is different from door to door, and depends on the distance of the locking mechanism 7 from the door casing when it is closed, an adjustment mechanism can be included so that the locking mechanism releases just as soon as the door 2 closes. The pin 43 can move into the recess on the latch bolt 8 and has a threaded hole configured to accept the screw 49, shown in FIG. 24. The screw 49 shifts the pin 43 along the recess when the screw 49 is rotated to the right or left and is enclosed by a spring 50 for stabilizing the pin 43. Given that the distance the latch bolt 8 retracts is different from door to door and depends on the distance of the locking mechanism 7 from the strike plate (not shown) on the casing of each door, and on the other hand the latch bolt 8 has an active role in the locking process since a portion of the sequential locking mechanism is coupled thereon, there is a need to adjust the travel distance of the latch bolt 8 so that the necessary travel distance to activate the locking mechanism is covered in each closing. This is achieved by the addition of a movable and adjustable component, known as a spacer, on the strike plate of the door casing 2, shown in FIG. 25.

The strike plate 10 is placed on the door 2 casing, while the spacer 51 is adjusted by screws, which two screws 52 define the position of the spacer 51 and two screws 53 stabilize the system in a specific position.

In another illustrative embodiment, the latch bolt 8, the ejection element 13, the shell 46, the pin 9, the return springs 14, 15 and the end-configured metal sheet, described above, are joined, through efficient geometry, in order to reduce the volume of the system and the materials required for the construction. The ejection element 13, the sequential mechanism shell 46 and the pin 9 form a module, shown in FIG. 26-FIG. 31. The bolt return spring 14 and the return spring 15 of the locking member are replaced by a common spring 54, which on one side is compressed by the movement of the ejection element 13 and on the other side from the bolt 8, when it retracts. The spring 54 is seated in an empty space formed by the bolt 8 and the pin 9. The end-configured sheet that activates and deactivates the locking mechanism rests on the bolt 8 and follows its movement.

The latch bolt 8 can be configured to include a channel 55 which can accommodate the return spring 54 and the pin 9. At one end of the channel 55 accommodating the return spring 54 there is a boss 56 which contacts the spring 54 and prevents it from coming out of the channel 55. When the bolt 8 retracts, pressure is exerted on the spring 54 compressing it. The boss 56 does not prevent the pin 9 from moving in a direction parallel to the bolt 8. The bolt 8 has a support point of the metallic plate 57. The latch bolt 8 can be constructed from more than one component for easier and more economical construction. The mechanism construction allows the bolt 8 to move in a range, from fully extended to fully retracted, into the housing of the mechanism.

The end-configured sheet 57 is shifted along the embossed channel 55 either because the end-configured sheet 57 is entrained by the bolt movement 8 or by the movement of the shell 46, which, in the present embodiment, is incorporated into the ejection element 13/pin 9. To achieve locking, the end of the end-configured sheet 57 has to travel a total path, partly due to the bolt movement 8 and partly to the movement of the ejection element 13. If only the handle 1 moves, or only the bolt 8 moves, the mechanism is not locked.

The individual movements of the bolt 8 or the ejection element 13 are not sufficient for the end to reach the locking point in order to operate the sequential locking mechanism, thus as a result, in actual operating conditions, it can be impossible to lock a door without the presence of a person.

Figure 29:
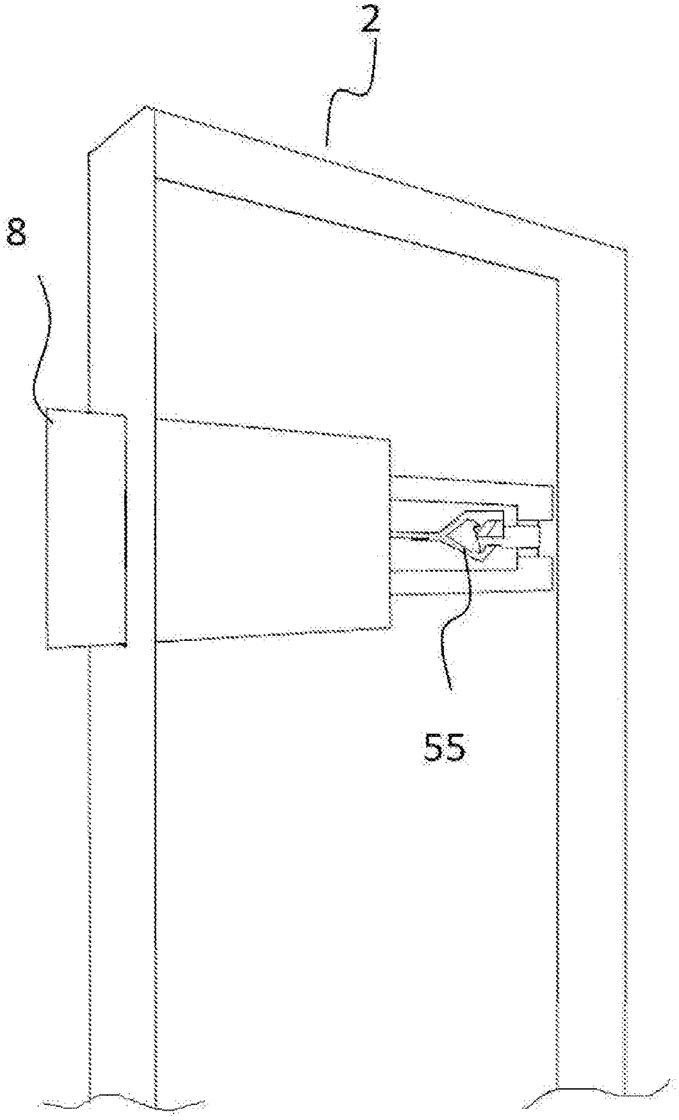
FIG. 29 illustrates the sequential locking mechanism when the door is open.
Figure 30:
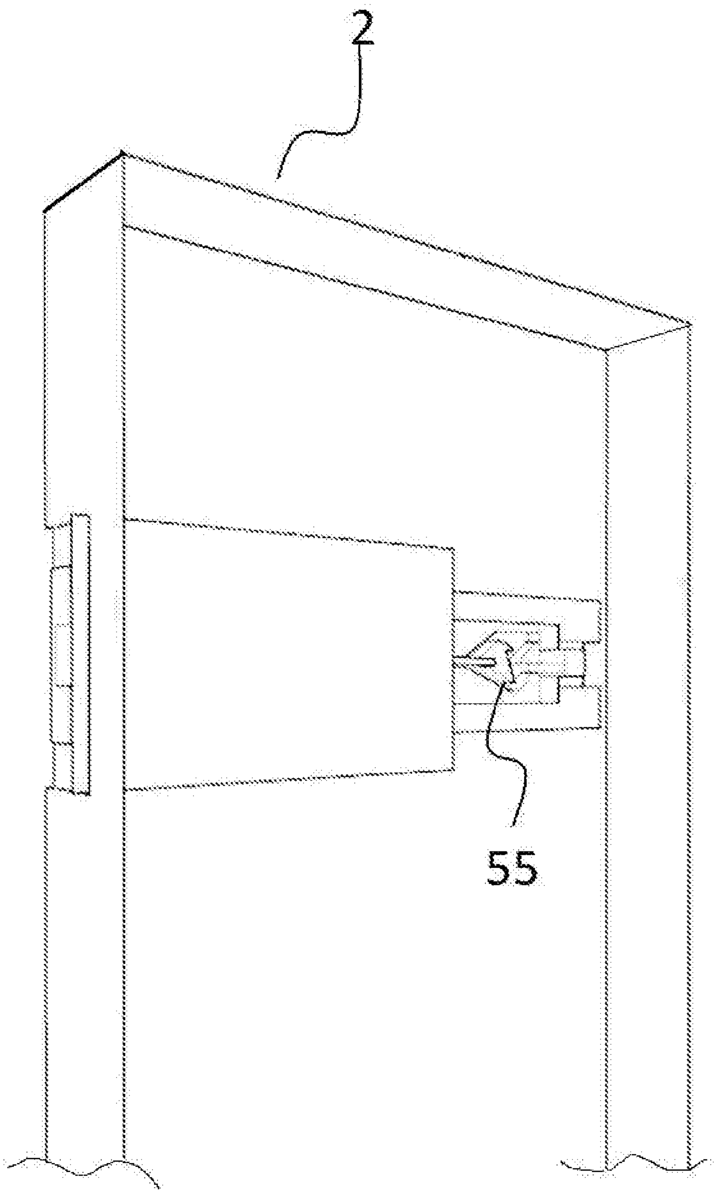
FIG. 30 illustrates the sequential locking mechanism when the door approaches the casing.
Figure 31:
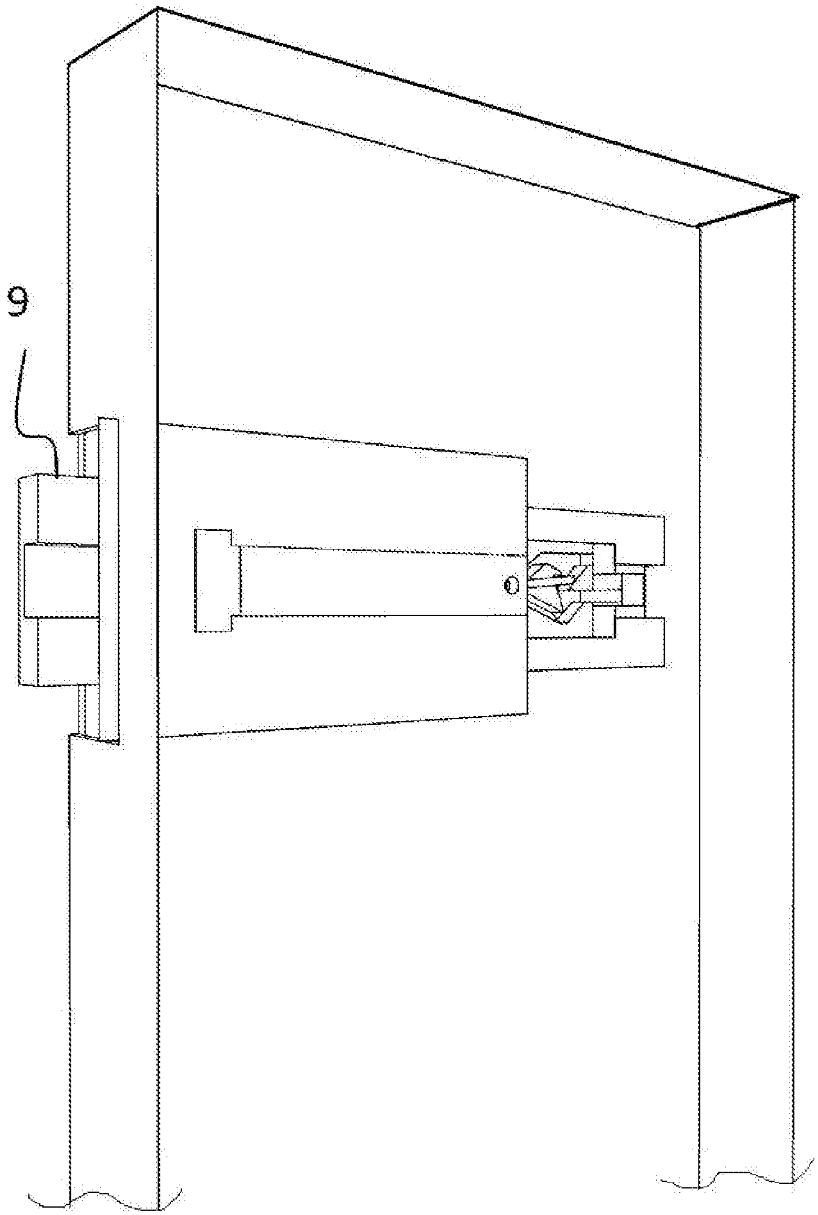
FIG. 31 illustrates the sequential locking mechanism when the door is locked.

FIG. 29 shows the mechanism in a position of rest where the bolt 8 is extended and the metal end is at the beginning of the locking channel 55, while FIG. 30 shows the door 2 closed, the bolt 8 being in contact with the plate 10 on the casing and having entered the shell 46 of the mechanism. The metal end has moved along the embossed channel 55. Additionally, the handle 1, as shown in FIG. 31, moves and pushes the ejection element 13. The metal end has moved further back, resulting in the pin 9 being stabilized in a locking position.

Figure 32A:
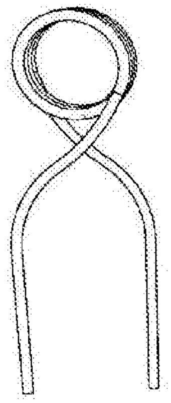
FIGS. 32A, 32B and 32C show exemplary forms of handle return springs.
Figure 32B:
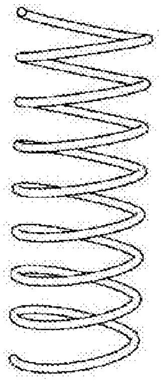
Figure 32C:
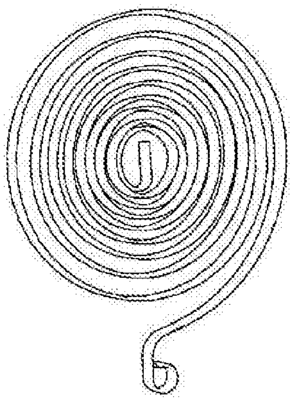

In other embodiments, the return spring of the handle 1 could be in the form of a twin action spring, as shown in FIG. 32A, a pressure spring, shown in FIG. 32B, or a rotation spring, shown in FIG. 32C. In the case of a twin-action spring, the spring returns the handle 1 to the initial position regardless of its direction of movement.

Figure 33A:
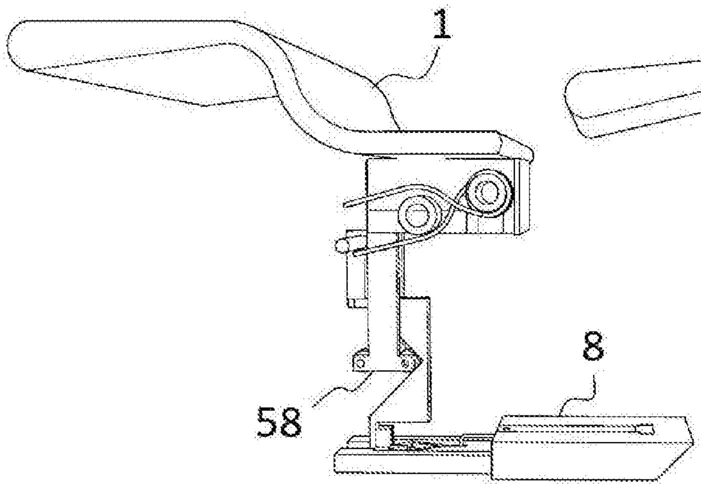
FIGS. 33A and 33B also show a mechanism for actuating the sequential locking mechanism.
Figure 33B:
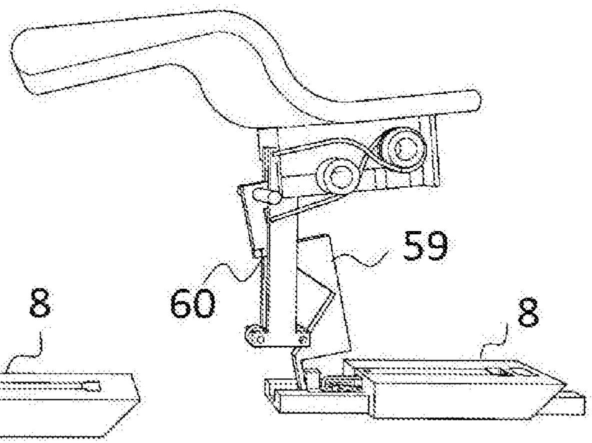

In FIGS. 33A and 33B another mechanism for converting the handle movement 1 is also shown. The component 58 is connected to the handle 1 and moves only upwards or downwards. The displacement pushes forward the triangular configuration of the component 59 regardless of the direction of movement of the handle 1. The component 59 in turn activates the sequential locking mechanism. In FIG. 33A, the component 59 abuts the component 58 at the top of the angle. In FIG. 33B, the bolt 8 has receded, the handle 1 has been brought down with the component 58, the component 59 has pivoted around the shaft 60 located at the upper part thereof and the lower of the component 59 has actuated the sequential locking mechanism.

Figure 34A:
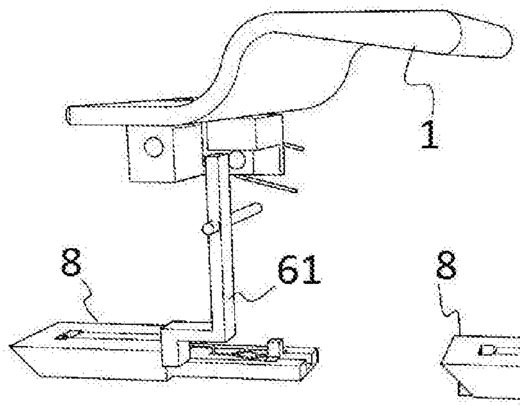
FIGS. 34A and 34B illustrate a handle stabilizing mechanism when pushing.
Figure 34B:
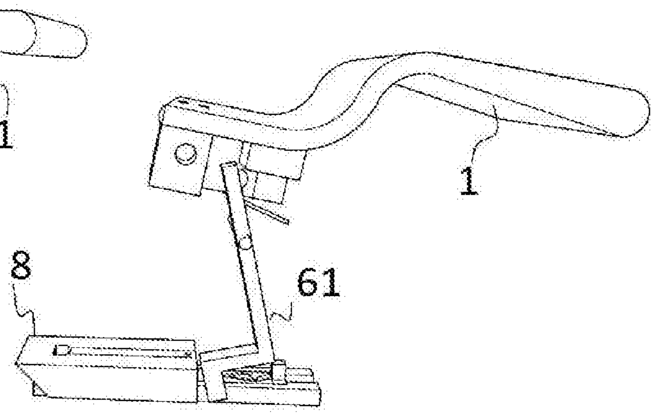

FIG. 34A and 34B show another stabilizing mechanism for the handle 1, which stabilizes the handle 1 only when it is pushed by the individual to close the door 2. When the handle is pulled by the individual, it moves freely.

The arm 61 in the initial position prevents the handle 1 from moving towards the door side 2 as its end comes into contact with the handle 1 and immobilizes it. When the door 2 closes and the bolt 8 recedes, the arm 61 is driven by the bolt movement 8 and rotates about the shaft 62. This rotation results in moving the end which prevents the movement of the handle 1 and the actuation of the locking mechanism. As a result of the above, the latch bolt 8 moves backwards, as shown in FIG. 34B, the arm 61 rotates and the handle 1 approaches the door 2.

Figure 35:
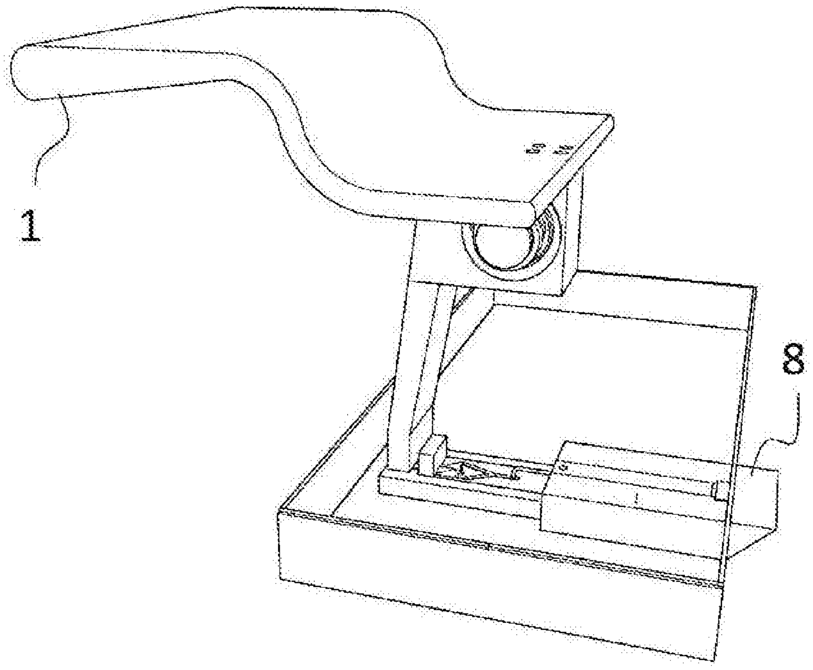
FIG. 35 illustrates a locking mechanism without handle stabilization.

In yet another embodiment shown in FIG. 35, the handle 1 is operable to move as long as the bolt 8 is extended beyond the lock 7 and the stabilizing mechanism is absent. By pushing the handle 1 the door 2 moves because the return spring of the knob is more resilient than the spring returning the door to an open position. When the door 2 is closed, the knob moves and activates the sequential engaging and disengaging mechanism 5. Locking is only achieved when the bolt 8 has retracted within the lock 7, and this is because the sequential locking mechanism is activated only when the bolt 8 moves inwardly of the door 2 and the pin 9 along with its accessories has simultaneously moved to the locking position. Even a sharp pushing of the door 2 which may result in the temporary recession of the handle 1 will not lock the door 2 because the sequential locking mechanism requires two movements for operating: that of the bolt 8 and the handle 1. The order of movement does not change the mechanism's functionality.

Figure 36:
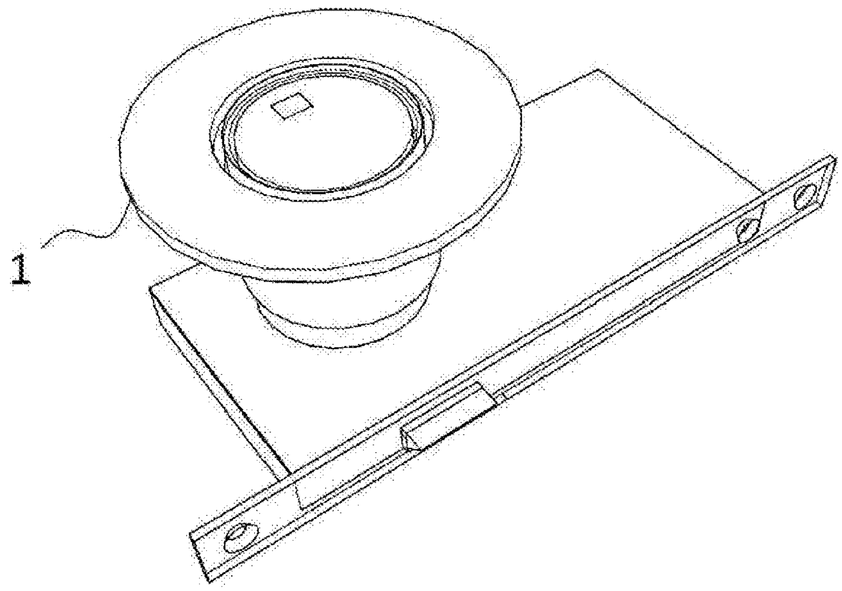
FIG. 36 shows a parallel displacement handle relative to the door.

FIG. 36 shows a handle 1 that the individual pushes to lock and unlock the door 2. The handle 1 moves parallel to the door 2 approaching or moving away from it. The handle 1 has the same alternatives to the handles that rotate around an axis parallel to the door. In other words, it may or may not have a stabilizing mechanism, may or may not have a motion conversion device, to unlock either by pushing or by pulling. The handle 1 includes a return spring 54 in the initial position and is fastened to a mechanism such that the movement of the knob activates the sequential locking mechanism.

Figure 12:
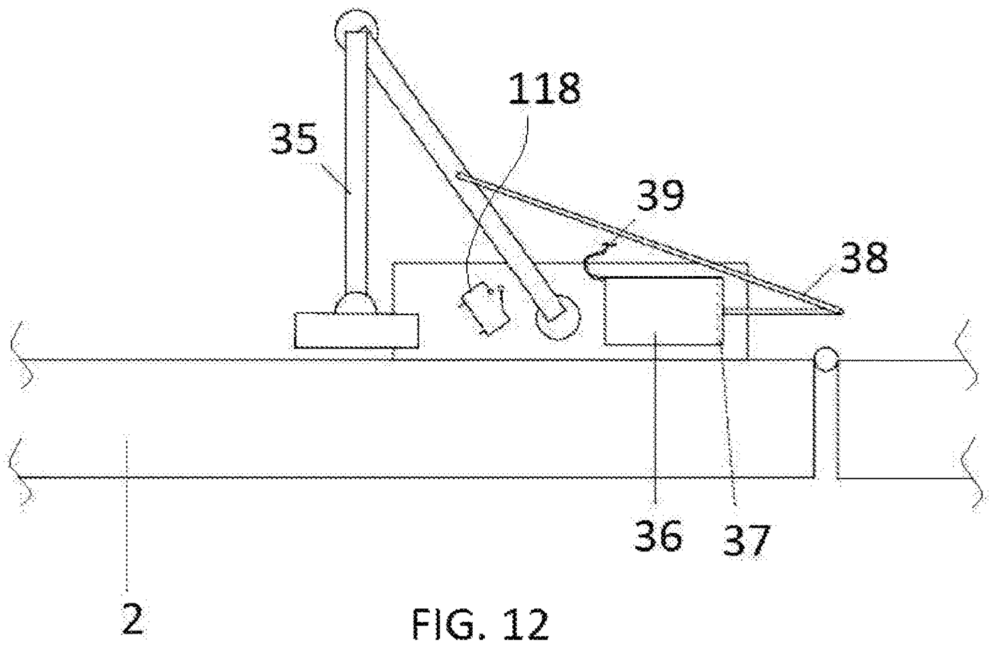
FIG. 12 is an exemplary embodiment of the door return mechanism.

In an embodiment, the contact-minimizing door opening and closing system may be provided with a mechanism for returning the door 2 to an open position, shown in FIG. 12. This means that the door 2, after unlocking, opens, for example, by 65±25° automatically. This is particularly useful in the case of common use toilets, for example, where when a door is open, it is clear that the toilet is not occupied. The opening of the door is made by using a return mechanism 35. There are many ways to open the door when not held by the lock. These are, for example, self-closing hinges that open the door by means of gravity, spring-loaded hinges, magnets that repel the door from the casing, a spring in a mechanism compressed when the door is closed, a hydraulic system for smooth door opening (overhead hydraulic door opener), a floor-mounted hydraulic door opener, a spring which incorporates a hydraulic door opener, a spring with an adjustable opening angle that acts when the door moves away from the point of equilibrium either inward or outward, a pivot door opener, and so on. As further shown in FIG. 12, the mechanism contains an electric switch 118, which can be a simple switch or a timer switch, for example, that is connected to lighting, ventilation, deodorant sprayer and/or toilet cistern in the room. Switch 118 is set to sense or detect an idle position of the mechanism. When the mechanism is moved from the idle position, switch 118 is activated. Switch 118 activates and deactivate the room's ventilation, lighting, deodorant sprayer and/or any other electric device used in a toilet, including a cistern.

Figure 13:
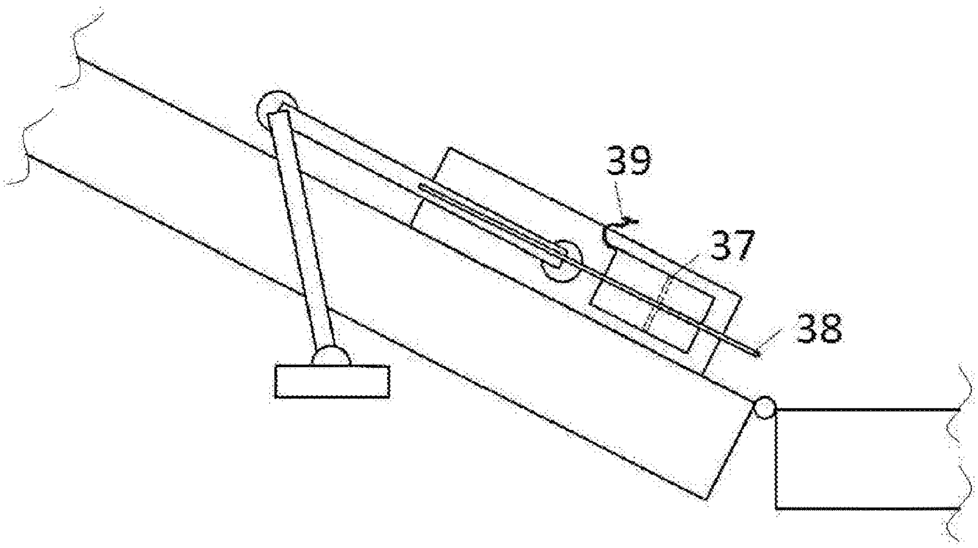
FIG. 13 shows the pneumatic plunger for use in a toilet cistern.
Figure 14:
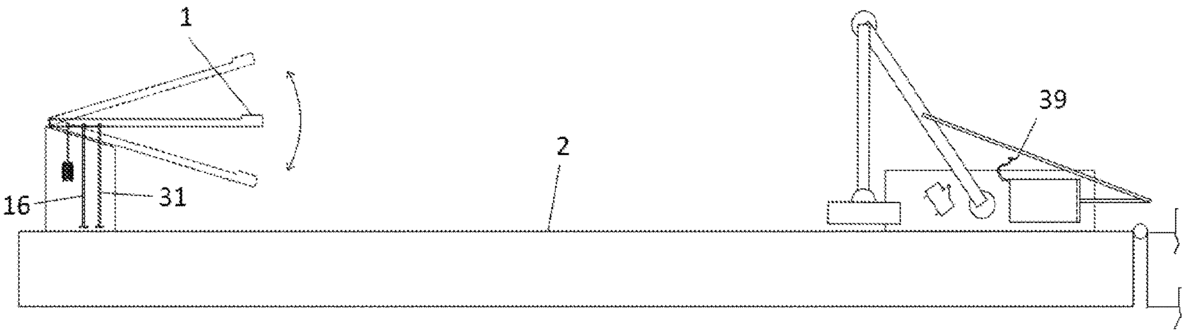
FIG. 14 is an exemplary illustration of the door in a closed position.
Figure 15:
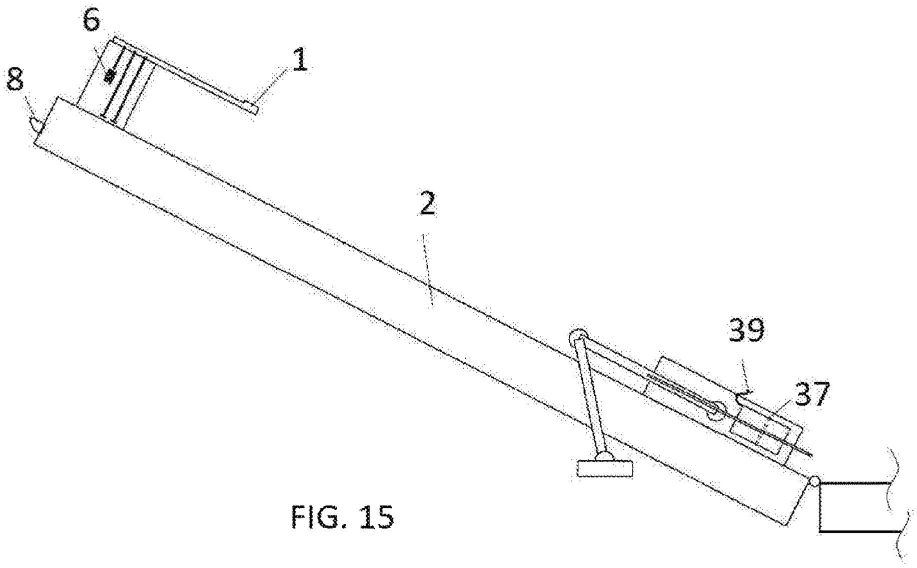
FIG. 15 shows the door in an open position.

In yet another embodiment particularly suited for installation in a common use toilet, the return mechanism 35 of the door 2 can be connected to a toilet flush, ensuring that the toilet flush, without any intervention of the individual, can be automatically activated when opening the door 2 and the individual exits the toilet. In the present embodiment, the cylinder 36 with a plunger 37 is connected to the return mechanism 35 by means of rods 38. As shown in FIG. 13, upon opening the door 2 the rods 38 push the plunger 37 into the cylinder, causing the compressed air to flow through the tubing 39 into the cistern, causing the toilet flush to operate.

Figure 37A:
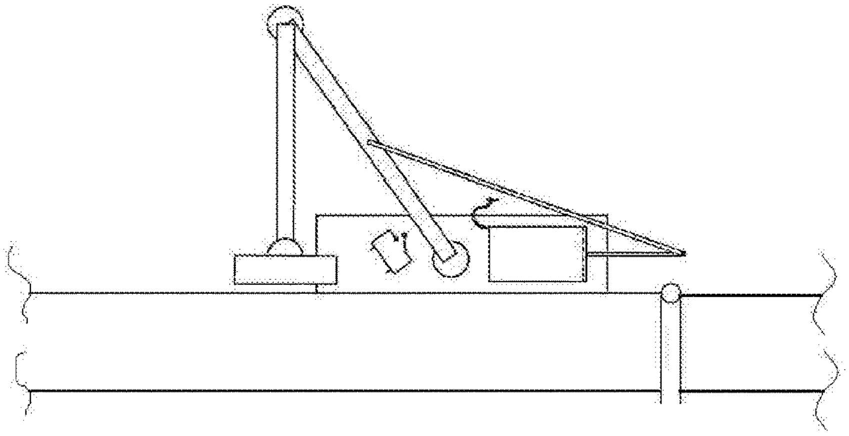
FIGS. 37A and 37B show the electronic device for handling appliances and toilet equipment.
Figure 37B:
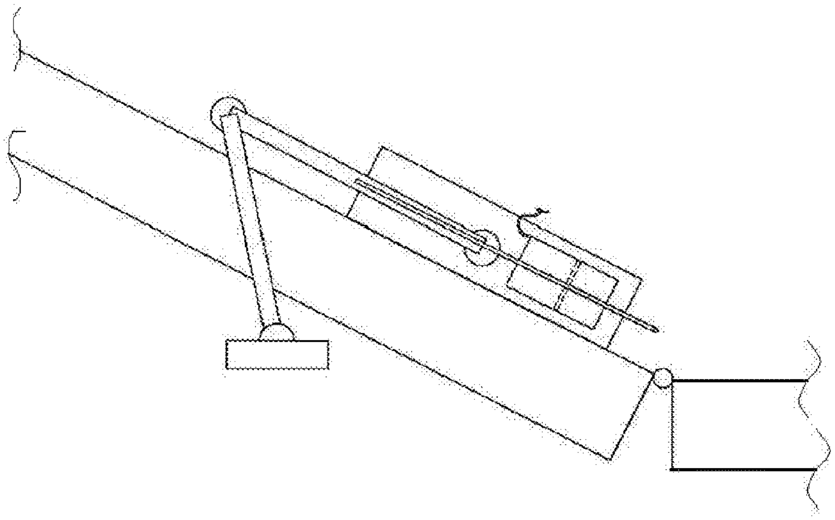

In other embodiments, the cistern can be actuated by using an electric switch, an energy-harvesting switch, or any suitable device that can carry the command after opening the door 2. FIG. 37A, for example, shows an electric switch that senses through the opening mechanism the angle formed by the open door, shown in FIG. 37B, and activates systems such as ventilation when the door is not in an open position, activates a time delay switch for ventilation when the door opens, switches off the light shortly after the individual exits the toilet, activates the cistern as soon as the door starts to open, activates the deodorization system, sterilization system, and so on.

In other embodiments actuation of the lock can trigger other systems as well. For example, where the lock is provided in a public toilet setting, locking the door can turn on lights and ventilation and unlocking the door turn off the lights and ventilation. In another embodiment, where the lock is provided in an office setting, unlocking the door can be configured to turn on lights and ventilation, and locking the door turns off the lights and ventilation.

Figure 38:
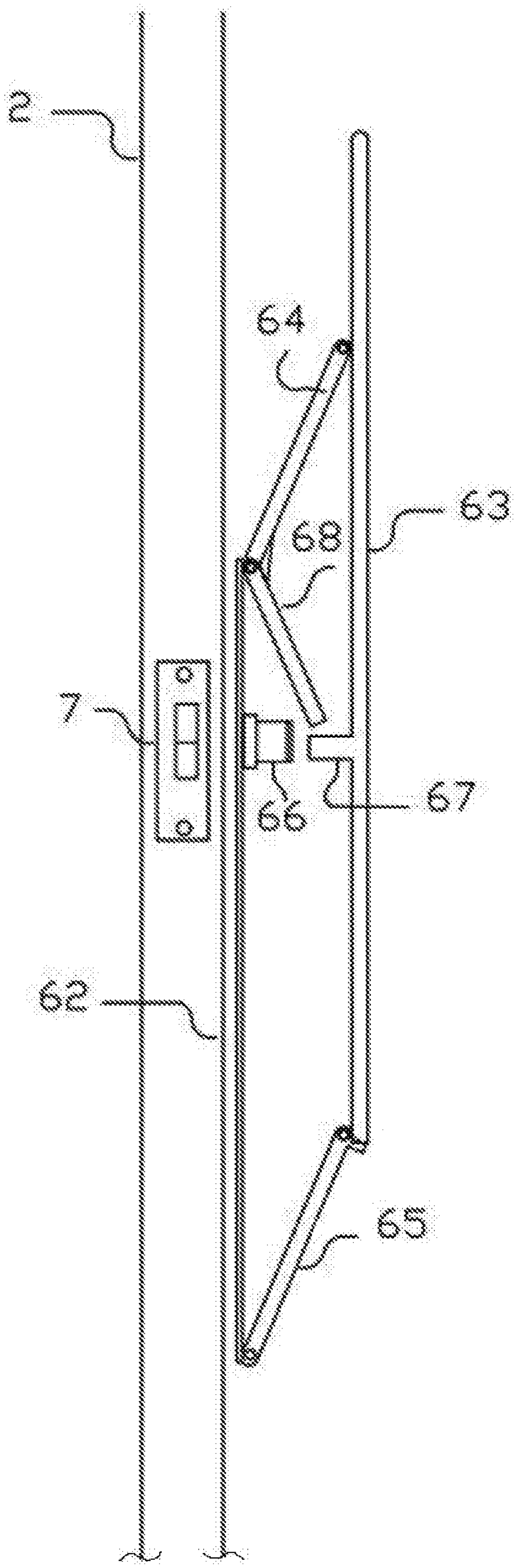
FIG. 38 shows a version of the system where the handle always moves parallel to the door.

FIG. 38. shows a handle mechanism in the form of a bar which is structured as a parallelogram consisting of four bars, grouped into two pairs, where the bars of each pair are of equal length. The bar 63 serves as the mechanism handle and can only move parallel to the door 2. The bars 64 and 65 are the same length, parallel to each other and have hinges at their ends that connect them to the bars 62 and 63.

In the present embodiment, the bar 62 is mounted on the door 2, but in another embodiment the bar 62 could be embedded in the door or the door may replace the bar provided that the bars 64 and 65 result in hinges on the door. The bar 63 moves back and forth parallel to the door because its freedom of movement is determined by the short parallel bars 64 and 65. The bar 63 on the upper side may be longer than the bar 62 and stick out of the bar hinge/axis of rotation 63 relative to the bar 64. This is intended to improve ergonomics in the event of pulling the bar-handle 63. When no forces are applied, the bar 63 starts from the equilibrium position and depending on the individual's movement, when pushed it approaches the door and when pulled it moves away from the door 2. When the individual stops exerting force, it returns to its original position. Depending on the embodiment, return to equilibrium position is made either by the spring inside the component 66 or by another spring.

Figure 39A:
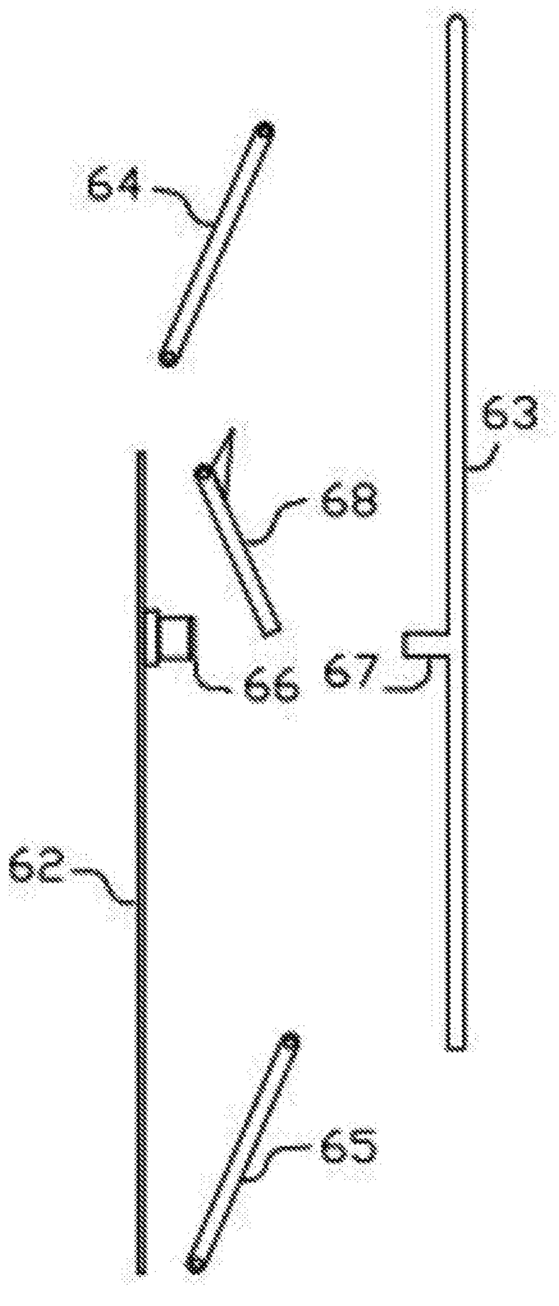
FIGS. 39A and 39B show the components that are the bi-parallel mechanism of FIG. 38.
Figure 39B:
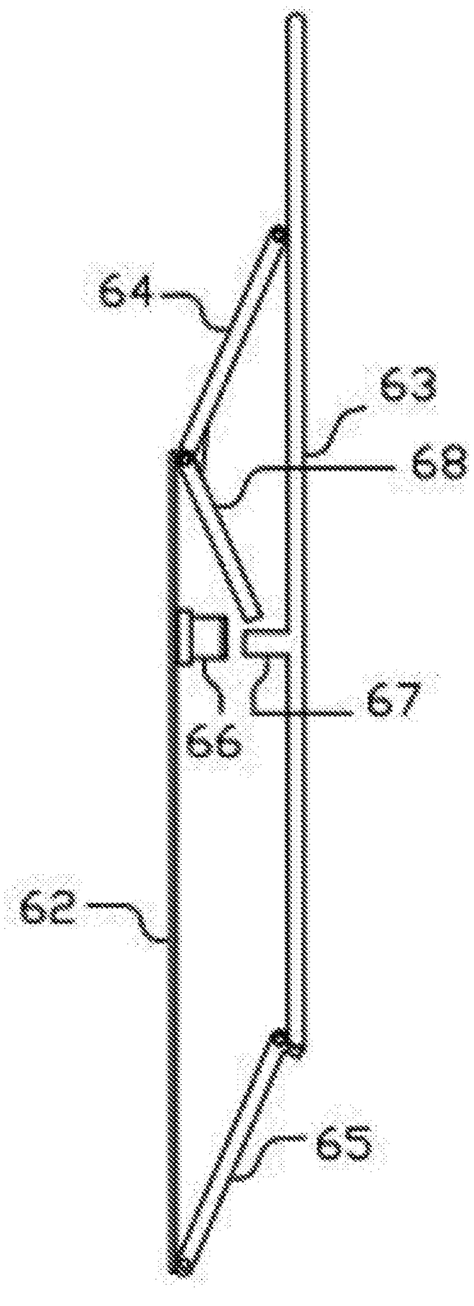

In FIGS. 39A and 39B, the components cooperate in such a way that the movement of the bar 63 causes the same movement to the locking mechanism 66, regardless of whether it is pulled or pushed by the individual. The component 67 which is attached to or part of the bar 63 pushes a part of the locking mechanism 66 when the bar 63 is pushed towards the door 2. The part 66 of the locking mechanism, when pushed causes in turn, the movement of the sequential locking mechanism 7. The bar 68 which is used to push the mechanism 66 when the individual pulls the handle-bar 63 towards it. The bar 68 rotates around a common axis with the bar 64.

When the bar 63 is pulled by the individual, it moves away from the door 2 and drags the bar 64 into rotation. The bar 64, in turn, contacts the bar 68 and due to its special geometric shape, causes it to rotate. The shape of the bar 68 is such that it is moved only when the bar 63 moves away from the door, not being affected by the movement of the bar

64 when the bar 63 approaches the door. The rotation of the bar 68 causes the part 66 of the locking mechanism to move.

Figure 40A:
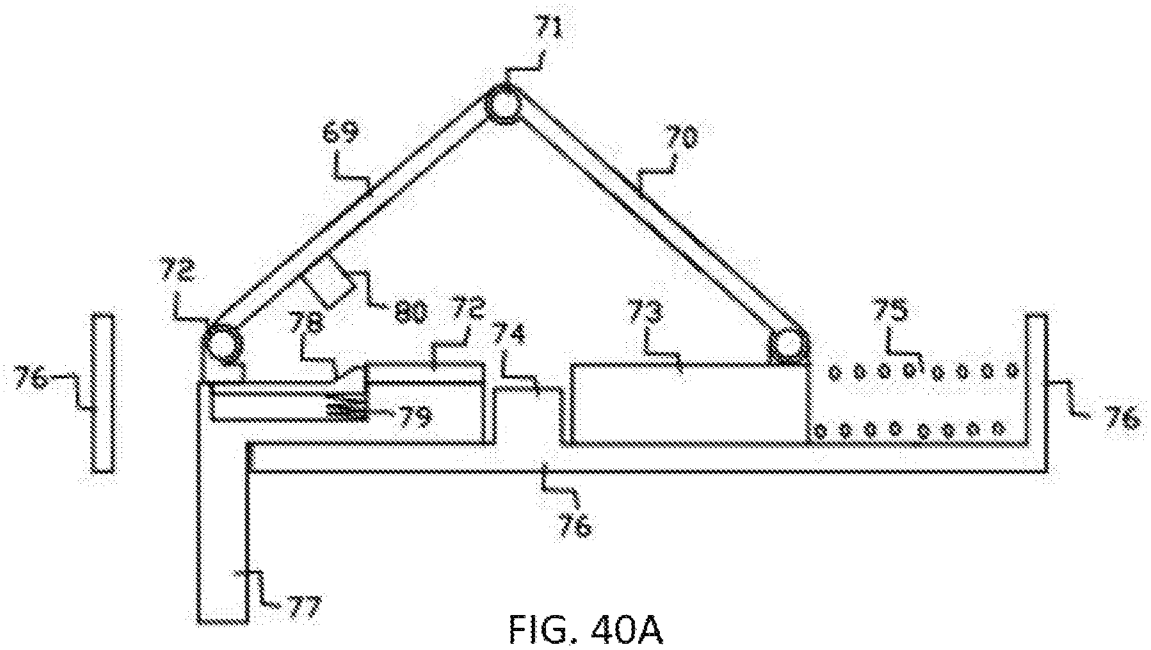
FIGS. 40A and 40B show a mechanism that transfers movement from the handle to the locking mechanism.
Figure 40B:
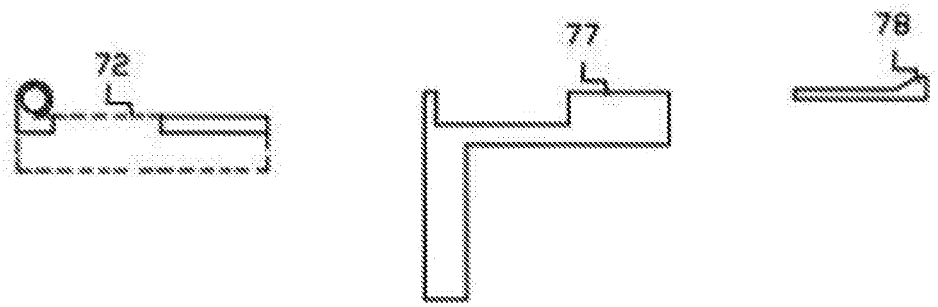

FIGS. 40A and 40B show a cross-sectional view of a mechanism which, when pressed, pushes the sequential locking mechanism. The mechanism consists of the plates 69 and 70 which are connected by a hinge at the crest 71 and can be rotated relative to each other. Moving the handle causes the hinge at the crest 71 to move into an equilibrium position, their connection is Λ-shaped. When pressure is applied to the formed crest 71, a downward movement of the crest 71 is caused, the plates 69 and 70 move away from each other and the forming angle tends to become straight 180°.

The sides of the plates 69 and 70 opposite the hinge 71 are mounted on bases 72 and 73 with hinges so that they can also be rotated relative to the bases. The bases 72 and 73 move in the same axis but in the opposite direction when the crest 71 is pushed as a result of the movement of the plates 69 and 70. The bases 72 and 73 move only in one direction due to the existing stopper 74. The base 72 can only move to the left because its right side contacts the stopper 74.

There are restrictions on the movement of the base 73 as on the left side it comes in contact with the stopper 74 and on the right side the base comes in contact with the spring 75. The spring 75 on one side comes in contact with the base 73 and on the other side it comes in contact with the shell 76.

The stiffness of the spring 75 is significantly greater than that of the spring located in the sequential locking mechanism and thus the base 72 will move. In some embodiments, the spring could be provided with an additional mechanism equipped with a safety that will prevent compression of the spring when compressive force exceeds a threshold.

The role of the spring 75 is to provide a means of relieving the forces applied to the system so that no damage is caused if the base 72 encounters an obstacle when transferring its movement to the locking mechanism. In this case the base 73 will move to the right compressing the spring 75.

The base 72 drags the component 77 when it moves away from the equilibrium position and not when it returns to the equilibrium position. The connection of the base 72 to the component 77 is secured by the safety 78. The component 77 in turn transfers the movement of the base 72 to the sequential locking mechanism. The spring 79 pushes the safety 78 in such a position that when the base 72 moves to the left of the figure, this movement also drags the component 77. If the base moves to the right the component 77 does not follow the base movement.

The plate 69 has a protrusion 80 which when the plates 69 and 70 tend to form a 180° angle, approaches and presses the safety 78 so that the component 77 is no longer attached to the base 72 and does not follow its movement.

Figure 41A:
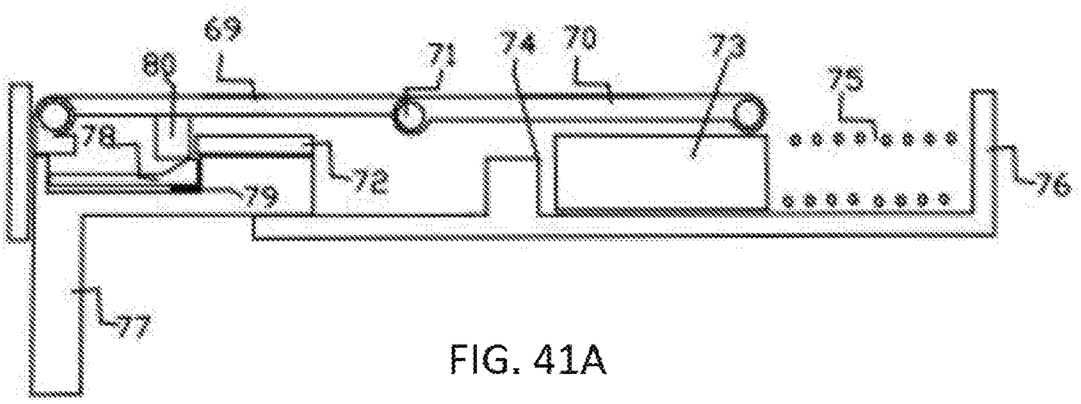
FIGS. 41A, 41B and 41C show the various positions the mechanism of FIGS. 40A and 40B can take when pressed by the handle.

In FIG. 41A the plates 69 and 70 have rotated relative to one another, moving away the bases 72 and 73 from each other. Due to the spring 75, only the base 72 has moved and the base 73 remains in its original position. The component 77 has moved to the left following the movement of the base 72. The protrusion 80 has shifted the safety 78 and the safety reset spring 79 has been compressed. In this position the component 77 is no longer firmly attached to the base 72 and can move freely.

Figure 41B:
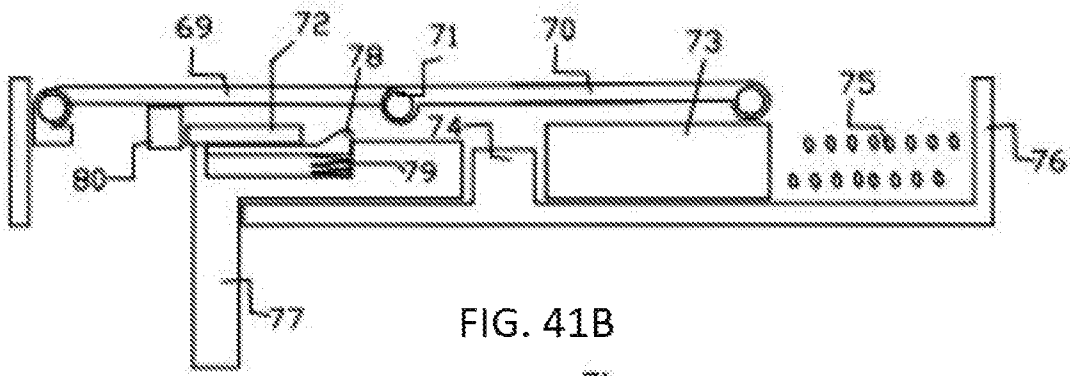

In FIG. 41B the component 77 and the safety 78 have returned to their original position. The component 77 is moved to its original position due to the force exerted thereon by the sequential locking mechanism. When the base 72 returns to its original position, the component 78 will return to its original position relative to the base 72 and "lock" on it.

Figure 41C:
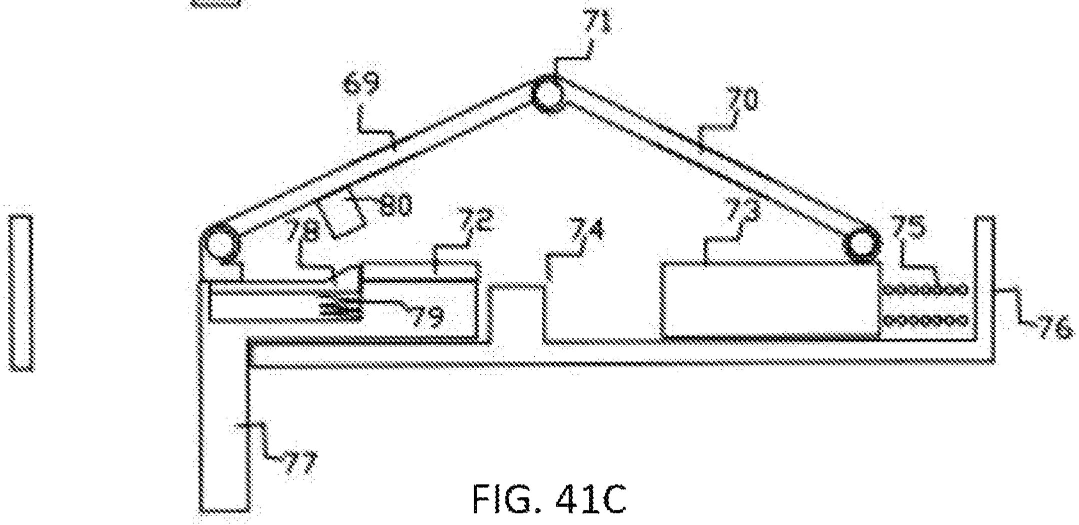

In FIG. 41C, the base 73 has moved to the right by compressing the extension spring 75. This happens when the component 77 cannot move for some reason and puts in turn a brake on the base 72. This safety device ensures that there will be no damage to the mechanism when forces are applied to the handle which the mechanism cannot absorb.

The sequential locking mechanism used by the system operates as follows: the push mechanism in its first movement (push to lock) locks the pin and then returns to its original position. In the next movement (push to unlock), the push mechanism unlocks the locking pin and returns to its original position.

All above mentioned ensures that each time the knob is moved, the sequential locking mechanism completes a (push to lock or push to unlock) movement. Releasing the component 77 allows the sequential mechanism to return to its original position and complete operation regardless of whether the individual continues to pull or push the handle.

Figure 42A:
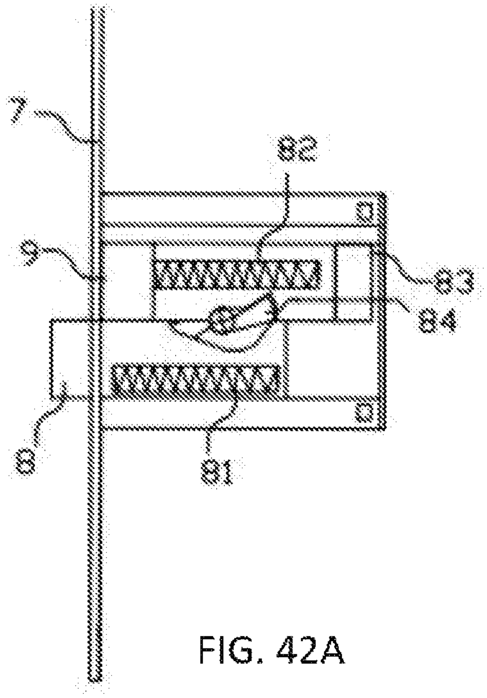
FIGS. 42A, 42B and 42C show a lock that has a mechanism that prevents locking when the door is open.
Figure 42B:
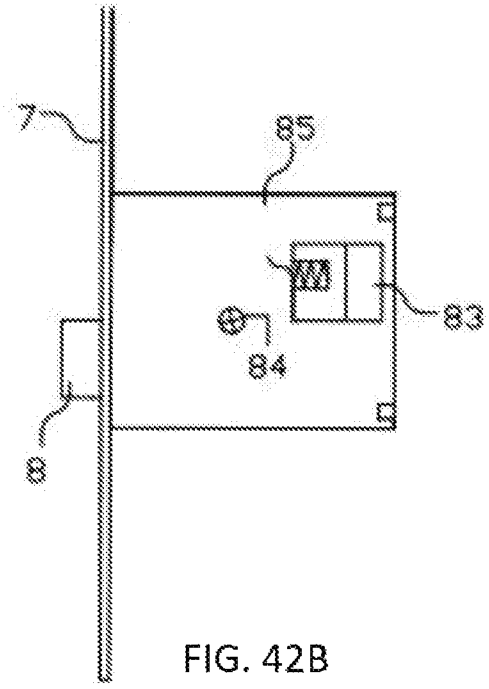
Figure 42C:
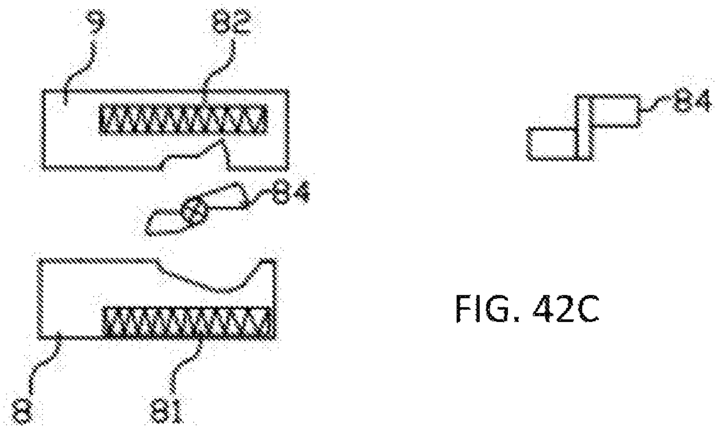

FIGS. 42A, 42B and 42C show an embodiment of a locking mechanism where the shell of the mechanism is mounted in the door. In such an embodiment the mechanism could be mounted externally on the door. The lock features a bolt 8, a locking pin 9, a bolt reset spring 81, a locking pin reset spring 82, and a hole 83 in the shell 85 of the mechanism through which a locking pin push component enters, and a rotating safety 84. The safety 84 rotates about a fixed pivot relative to the lock shell. The purpose of the construction is to ensure that the locking pin cannot move and lock if the door is open.

The safety 84 rotates and changes positions with respect to the locking pin and the bolt. When the door is open, the latch bolt 8 is extended outside the lock shell and the safety 84 is in a position that prevents the locking pin from moving forward and locking. When the door is closed, the bolt 8 retracts due to its contact with the metal plate 10 The movement of the bolt turns the safety 84 around its axis of rotation so that the safety no longer prevents the locking pin from moving and makes it possible to lock the door. Moving the locking pin forward does not allow the safety to rotate. When the door is unlocked, the locking pin returns to the original position under the action of the reset spring 82 and the safety can be rotated again. As soon as the door is opened, the bolt comes out of the lock shell under the action of the reset spring 81. The bolt movement rotates the safety to its original position where the safety prevents the locking pin from moving.

In practice, when the individual wants to close and lock the door, he/she pushes the handle, which due to the presence of the safety 84 inserted between the push mechanism and the bolt, cannot transfer its movement to the locking pin. The door must first be moved to the closed position. When the door is closed, the bolt 8 retracts inside the lock because it is pressed against the fixed plate 10. Moving the bolt inside the lock causes the safety 84 to rotate and consequently the locking pin 82 to release. The releasing of the locking pin allows the sequential locking mechanism to lock the door. Unlocking requires re-pushing the sequential mechanism by moving the handle.

Figure 43A:
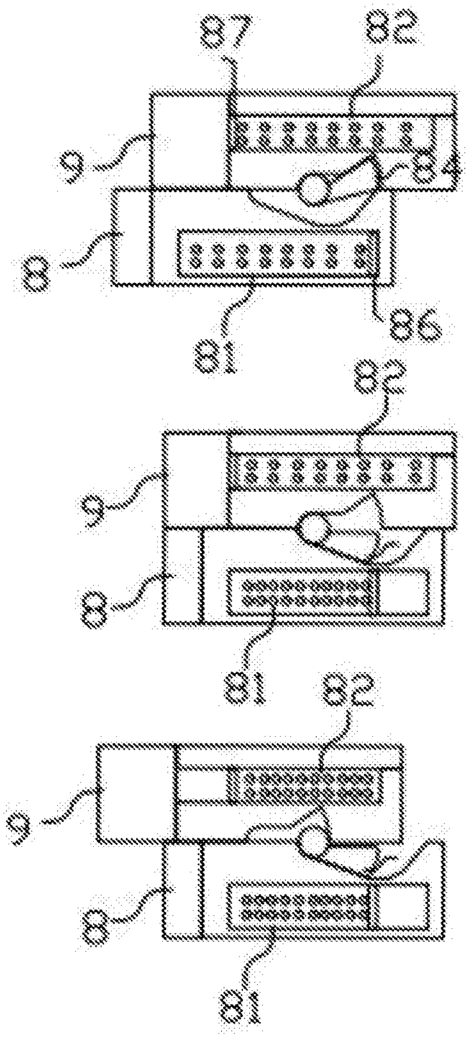
FIGS. 43A and 43B show the possible positions of the latch bolt and the locking pin.
Figure 43B:
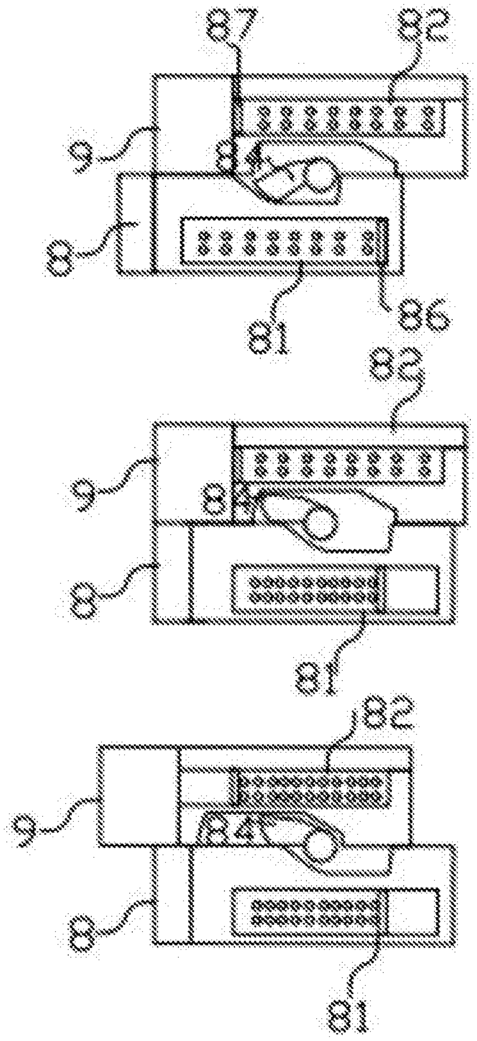

FIGS. 43A and 43B. show sections at the top and bottom of the mechanism. In the left column (FIG. 43A) the sections show the upper part of the safety 84 of the locking pin 9 and the bolt 8. The right-hand column (FIG. 43B) shows the lower section of the corresponding components. In the first row, the fittings have an open-door position where the springs 81 and 83 push the bolt 8 and the pin 9 respectively against the mounting brackets 86 and 87 fixed on the shell.

As shown in the figure on the left-hand column in the first line, the shape and position of the upper part of the safety 84 is such that when the bolt 8 is extended outward, the safety 84 prevents the pin 9 from moving relative to the bolt 8. In the second row of drawings, the components have a closed-door position where the spring 81 is squeezed due to the movement of the bolt inside the lock shell. The safety 84 is rotated and as shown in the left drawing of the second row does not prevent the locking pin 9 from moving. The rotation of the safety 84 is due to its shape relative to the respective shape of the bolt in their lower section shown in the right-hand drawing of the first row.

In the third row of drawings, the components are in the position they take in the case of a closed and locked door where the spring 81 is squeezed due to the movement of the bolt inside the lock shell and the spring 82 is also squeezed because the locking pin has come out of the shell locking the door. The shapes of the safety 84 and the bolt 8, as shown in the left-hand drawing of the third row, are such that when the bolt returns to its original position it rotates the safety to take its original position. (left drawing, first row).

Figure 44A:
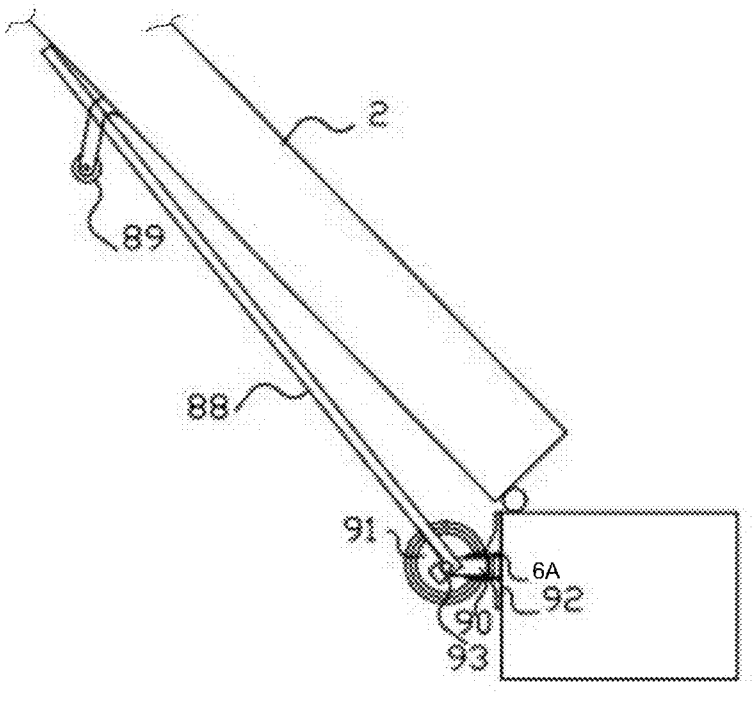
FIGS. 44A and 44B show an automatic door opening mechanism when it is in the open position.
Figure 44B:
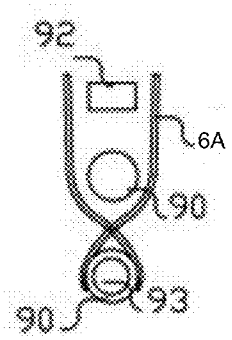

FIG. 44A and 44B show the automatic door opening mechanism. This embodiment consists of a hydraulic mechanism 91 which regulates the door opening speed, a shaft 93 connecting the hydraulic mechanism to the attached components, the arm 88 mounted on the shaft 93, the component 89 on the door 2 that transfers the arm's movement to the door, a dual action spring 6A exerting force when pressed either clockwise or counterclockwise, a component 90 mounted on the shaft 93 and pressing the reset spring when the shaft rotates, a hydraulic mechanism mounting bracket on the fixed part of the door 92, and a component 90 on the hydraulic mechanism holding the reset spring.

The door 2, when no force is exerted upon it, remains open in a position defined by the arm 88. This position of equilibrium is adjusted when the arm 88 is attached to the shaft 93. The component 89 transfers the door movement to the arm and vice versa. The automatic door opening mechanism works in the contrary way with respect to a standard door closing mechanisms. The spring is pushed either the door is pushed to close or to open beyond the equilibrium position. The automatic door opening mechanism helps prevent accidents, avoid sudden door movements when opening and improve the individual experience. This is because the individual simply unlocks the door in one operation and waits for it to open on its own. The hydraulic system ensures that the opening is made at a speed that does not cause problems.

Figure 45A:
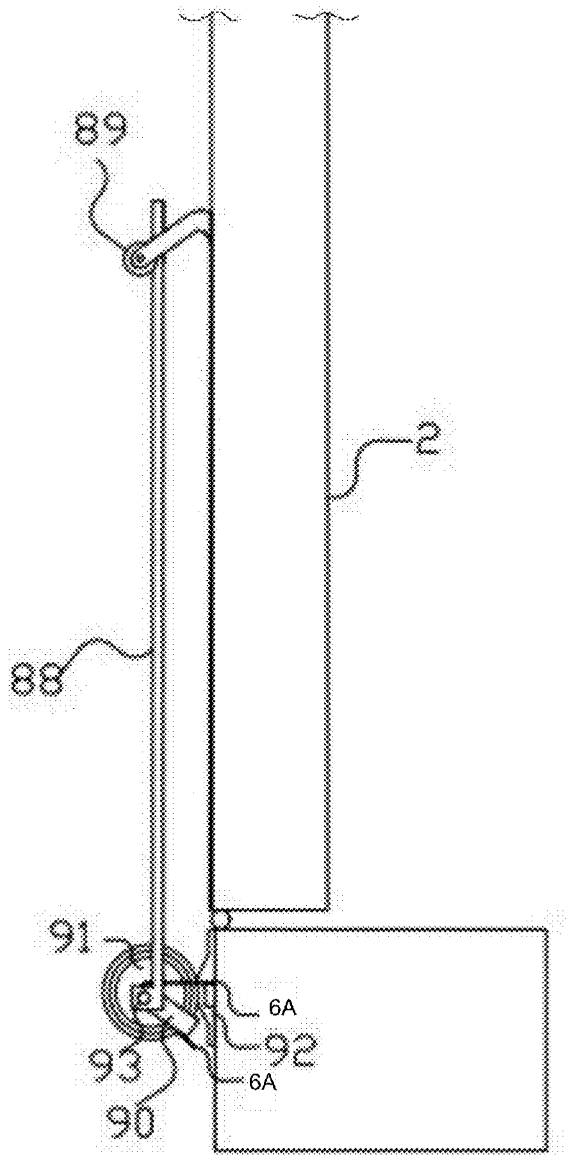
FIGS. 45A and 45B show the same automatic opening mechanism when the door is closed.
Figure 45B:
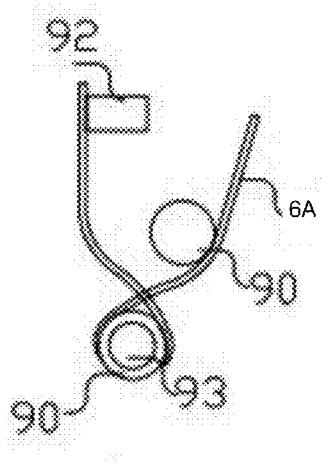

In FIG. 45A the door is closed. The spring 6A (shown enlarged in FIG. 45B) is pushed by the fitting 92 and the fitting 90 which moves following the rotation of the shaft 93. The rotation of the shaft 93 of the hydraulic mechanism 91 is due to the individual moving the door 2 to close and which in turn has shifted the arm 88 through the fitting 89. If the individual pushes the door to open beyond the equilibrium position (as opposed to closing the door), the spring 6A will undergo symmetrical deformation as the side adjacent to the component 90 comes in contact with the component 92 and vice versa. The spring 6A has the ability to act in both directions so that the door always opens at a certain angle. If the door is pushed by an individual to open at a greater angle than the equilibrium one, the spring will return it as soon as the force is stopped.

Figure 46:
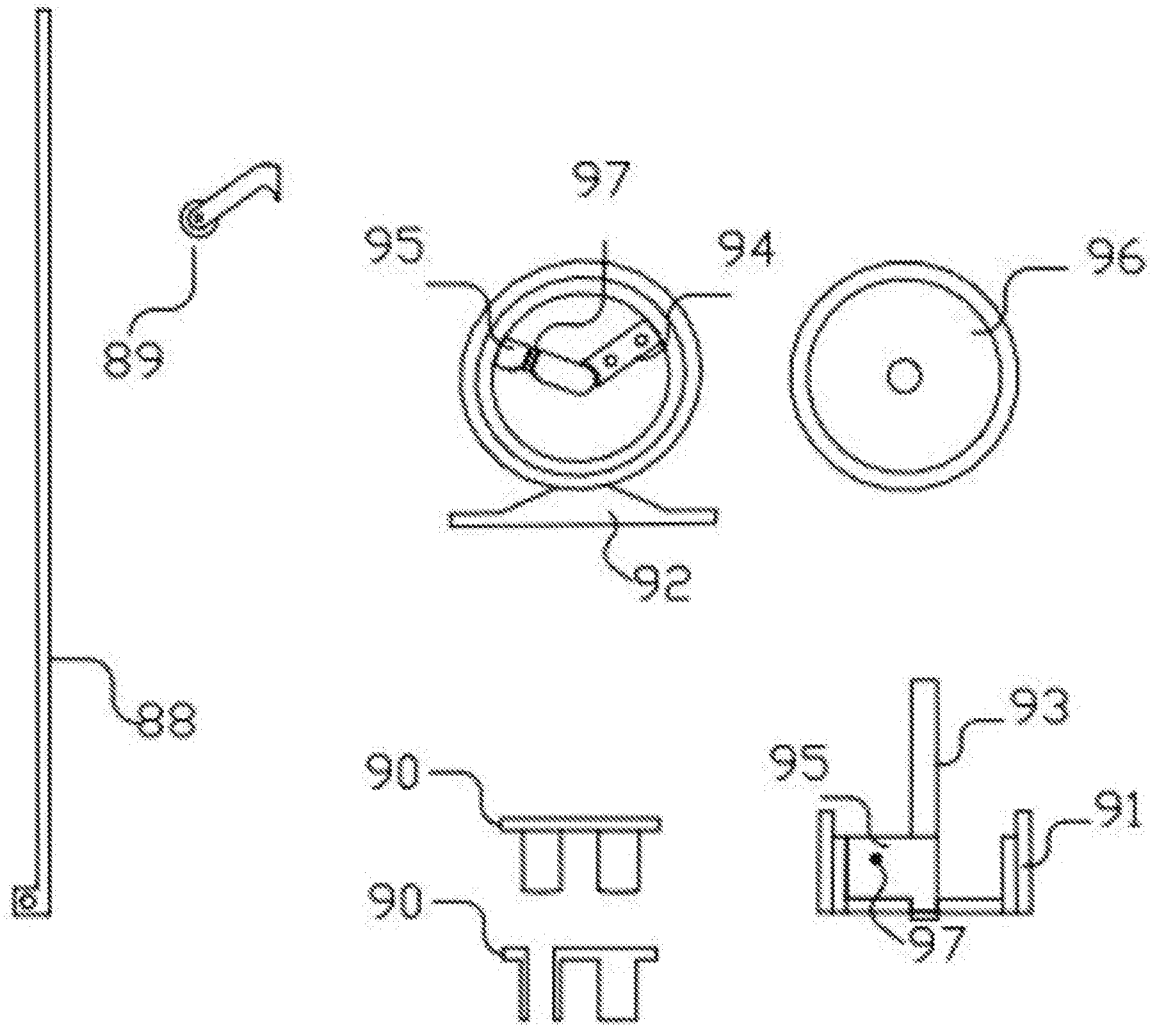
FIG. 46 shows the components of the automatic opening mechanism.

In FIG. 46 the hydraulic mechanism consists of the shell 91, the lid 96, the fixed component 94 inside the shell, the movable component 95 inside the shell, the shaft 93, the mounting base 92, the dual action reset spring 6, the spring support and pressure fitting 90, the arm 88, the fitting 89 and the valve 97. The shaft 93 and the fitting 95 move together. The fluid inside the mechanism shell is divided into two volumes because the components 93, 94, 95 are inserted between them. The shaft rotation together with the component 95 causes change of the fluid volumes in the individual portions. The amount of fluid being transferred from one part to the other passes through the valve 97.

The resistance to fluid flow can cause the shaft, and therefore the door to move smoothly. The flow restriction can be the same in either direction or the flow could be freer to the direction the door closes. Thus, when the individual closes the door, the only resistance to the door movement will be the spring charge. When opening the door automatically the movement will be smooth due to the hydraulic resistance caused by the restriction of fluid flow. Limiting the speed at which the door opens intends to prevent the individual from being hit by the door on the opening as unlocking is done in one simple motion where the individual does not need to touch the door.

The resistance to fluid flow can be user-adjustable. The flow may have different adjustments for each direction of door movement, for example, the resistance may be higher when the door is opened so that the automatic opening inwards is not sharp while exhibiting reduced or zero resistance when pushing the door to close. Installing the flow regulating valve in another embodiment can be done in a lumen on the lid 96 connecting the two volumes of fluid for easier adjustment. The lid 96 can include O-rings and a flange for sealing the shaft and the container.

In FIG. 47A-C, an embodiment can be provided with a locking pin fixing member that replaces the bolt and the safety. FIG. 47A-C show an embodiment in which the mechanism is mounted externally above the door.

The component 98 rotates around a pivot and is balanced by being pressed by a spring 99. The geometry is such that the locking pin is prevented from moving when it is in equilibrium position. When the door closes, the end of the component 98 meets the fixed component 100 on the door frame and is moved. This motion releases the locking pin that can now move and lock.

When the door is unlocked, the locking pin returns to its original position in the lock shell and the spring 99 pressed by the component 99 again blocks the pin movement.

Figure 48:
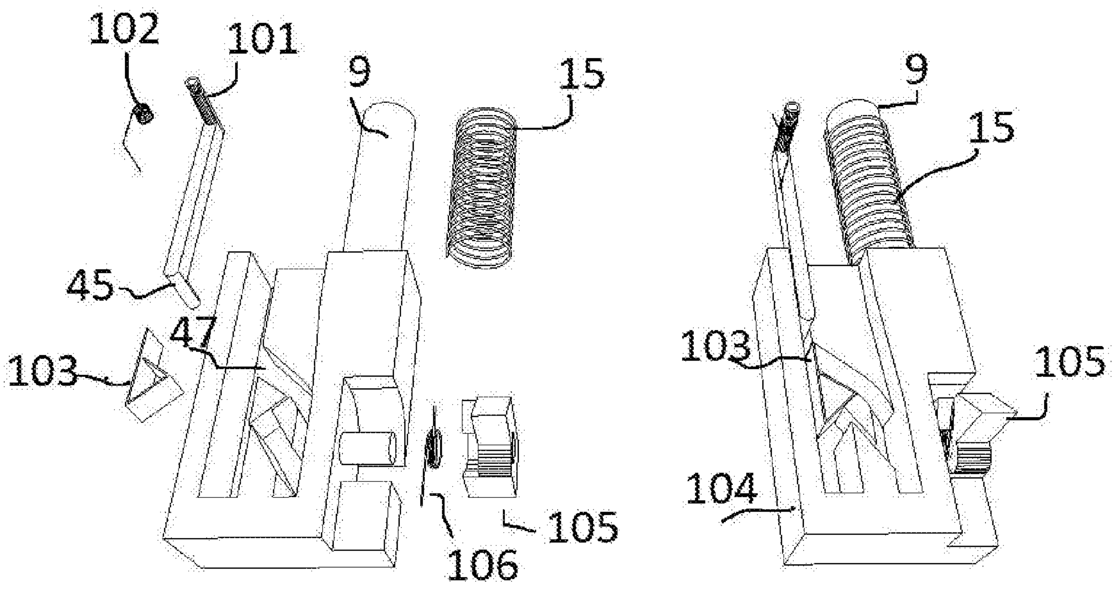
FIG. 48 shows another type of sequential engaging and disengaging mechanism for locking and unlocking.

FIG. 48 shows the inverted end within the shell, which carries an embossed channel, defining the end movement. The sequential engaging and disengaging mechanism, guides the pin 9 movement in each movement of the handle 1 and the shell 103 consists of the inverted end 45, the direction safety 103 and the channel 47. The inverted end 45 switches to the locking position by travelling, from the upper side of the embossed channel 47 and switches from the locking position to the open position by travelling from the underside of the embossed channel 47. The return spring 15 allows the pin 9 to come to its initial position. The component 103 also includes the spring 102 which aims at giving the inverted end 45 the right tendency to follow the right track and is placed about the rotation axis 101. The component 105 is the one pushing the shell 104 and therefore the pin 9 to the locking position and is accompanied by the spring 106 for tension alleviation.

Figure 49:
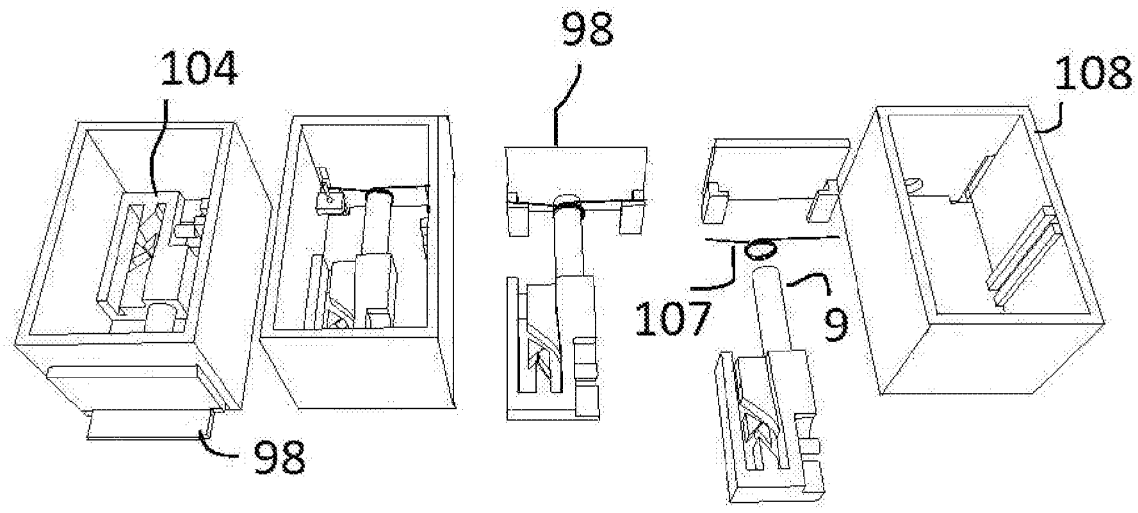
FIG. 49 shows the sequential engaging and disengaging mechanism and the stopper that prevents its movement when the door is open.

FIG. 49 shows the sequential engaging and disengaging mechanism, where the pin 9 is stopped by the stopper 98. When the door closes, the end of the stopper 98 meets the fixed component located on the door frame and is moved. This motion releases the locking pin that can now move and lock. The stopper 98 can move relatively to the lock's shell 108. When the door is unlocked, the locking pin returns to its original position in the lock shell. The purpose of the construction is to ensure that the locking pin cannot move and lock if the door is open. The spring 107 pushes the stopper 98 back to the pin locking position when the door is open and locking pin is retracted.

Figure 50:
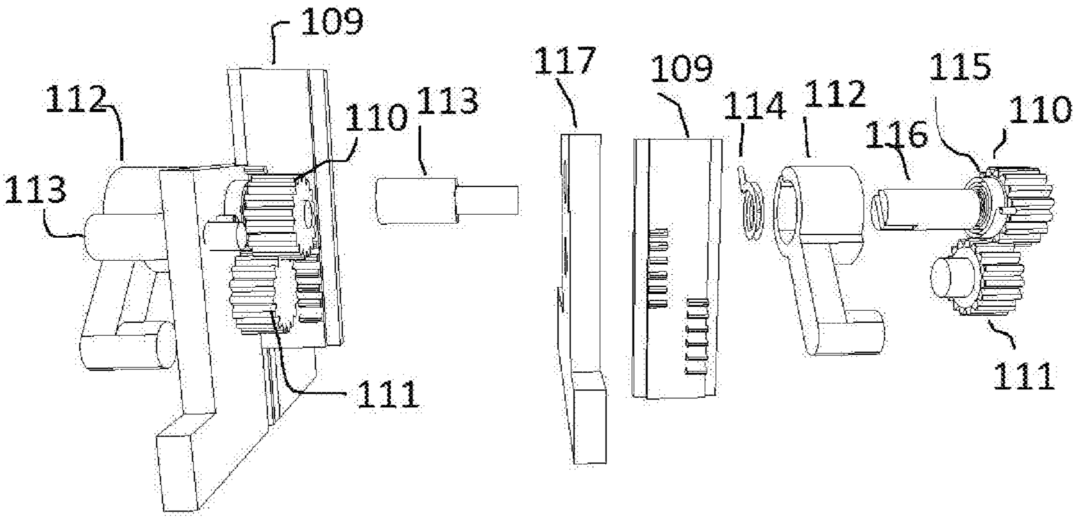
FIG. 50 shows the mechanism that converts the handle movement into the sequential engaging and disengaging mechanism.

FIG. 50 shows the mechanism that transfers the handle's movement to the sequential engaging and disengaging mechanism by the engagement of the pinion gears 110, 111. The rack component 109 has gear configurations on the upper left part and on the lower right part. This embodiment reduces the height of the mechanism compare to other solutions. Each gear configuration of the rack interacts with one gear only. The left rack can turn the lower pinion gear 111 and the right rack can turn the upper pinion gear 110. Pinions 110 and 111 contact each other at a maximum of 50% of their width. The other 50% can contact the gear configurations of the rack. This way only one of the gears can be moved by the rack movement at a time. Consequently, either by pulling or by pushing the handle 1, one of these configurations will engage the pusher 112 and rotate it as it is connected to the axle 116 by the spring 114. Pusher 112, when turned clockwise, pushes the sequential locking mechanism to lock/unlock. So, the joint between pusher 112 and axle 116 is a safety spring 114. This joint allows to detonate high forces and ensures that there will be no damage to the mechanism when forces are applied to the handle which the mechanism cannot absorb. Such high forces may occur when obstacle blocks the door or individual makes sudden moves. Spring 115 turns the pusher 112 counter-clockwise back to the starting/idle position, the gears 110 and 111 in neutral position, and the door handle in neutral position. The component 113 is the stopper of the pusher 112 and keeps the spring 115 under tension.

Figure 51:
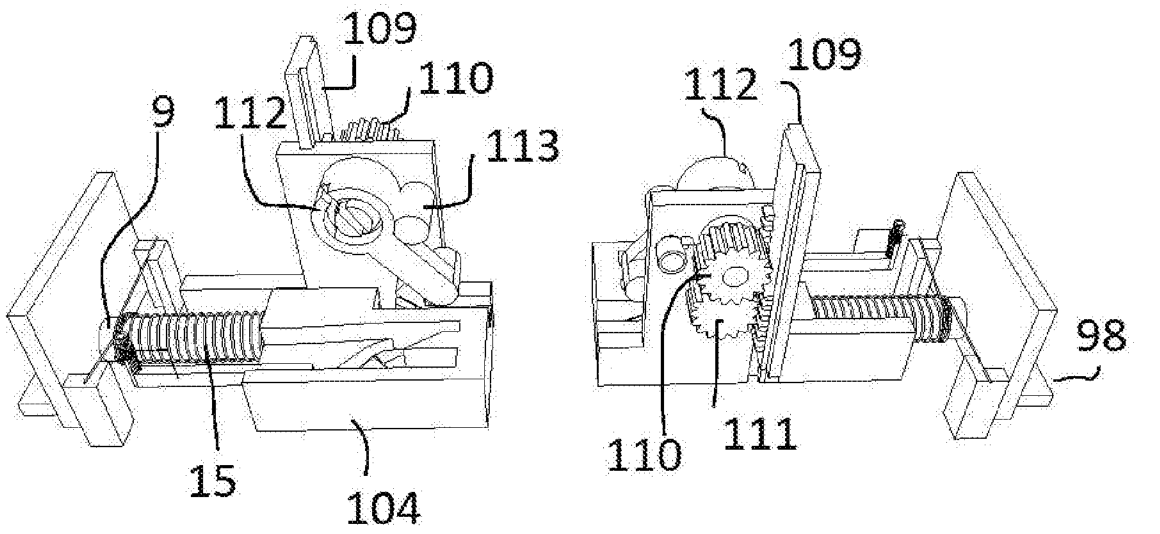
FIG. 51 illustrates two side views of the locking mechanism.

FIG. 51 shows the locking mechanism parts inside the shell 108 and their interaction. When part 109 is pushed or pulled, one of the pinions 110 or 111 is turned and this leads to the clockwise turn of the pusher 112. Pusher 112 presses part 105 and the sequential locking mechanism is activated, provided that stopper 98 is not blocking the pin 9.

Figure 52:
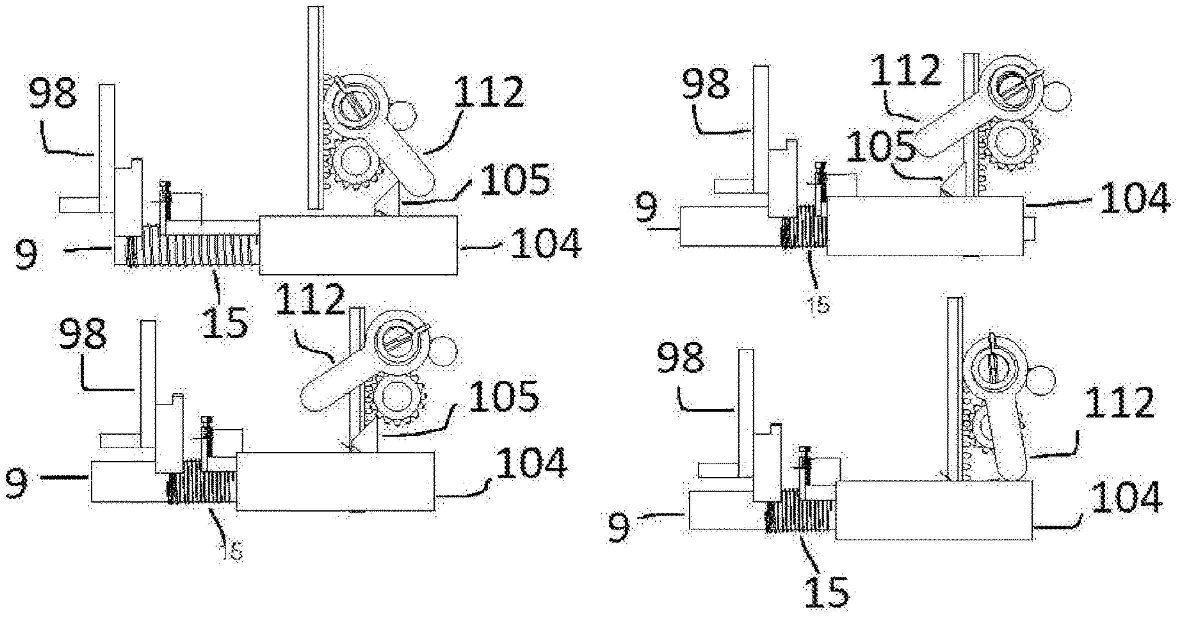
FIG. 52 shows the interaction between the mechanism that transfers the handle movement and the sequential engaging and disengaging mechanism.

FIG. 52 illustrates the whole locking mechanism which is placed in the casing 108. The sequential locking mechanism used by the system operates as follows. The push mechanism in its first movement (push to lock), locks the pin 9 and then returns to its original position. In the next movement (push to unlock), the push mechanism unlocks the locking pin and returns to its original position. All above mentioned ensures that each time the knob is moved, the sequential locking mechanism completes a (push to lock or push to unlock) movement. Pusher 112 rotates around its axle and activates the sequential locking mechanism by pushing part 105. At some point of this rotation part 105 is released and both parts (112 and 105) move independently from each other. In case the pusher 112, meets part 105 while returning to the initial position, part 105 bends, allowing pusher 112 to pass behind it. This function is very important as it allows individuals to unlock a door by pulling the handle and keeping it pulled. If this feature was missing, an individual should have to pull the handle and let it return in order to unlock the door. This could be confusing to new individuals. The only thing an individual has to do to open the locked door, is to push the handle towards the door and let it go. The door opens automatically. Another way is to pull the handle instantly and let the opening mechanism open the door. The least preferable way is to pull the handle. This movement requires individual to touch the handle with his hands.

Figure 53:
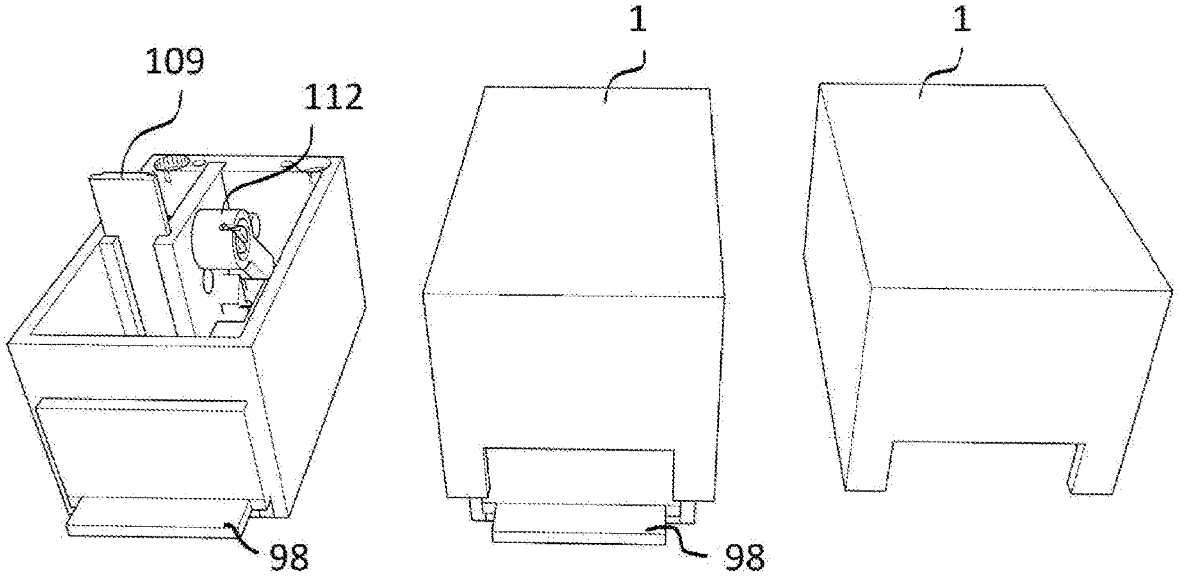
FIG. 53 shows the handle and the stopper in their initial position.

FIG. 53 illustrates the casing 108, the stopper 98 and the handle 1 that sets the movement to the locking mechanism either by pushing or pulling it.

Figure 54:
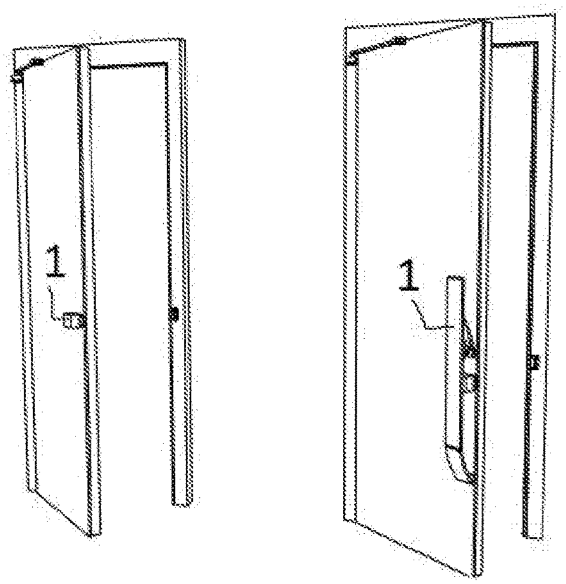
FIG. 54 shows two toilet doors with two types of handles and the opening mechanisms.

FIG. 54 shows two toilet doors opened by the opening mechanism as seen from the interior of the toilet. The locking mechanism is the same in both cases and the difference is the handle type. The door's position is controlled by the opening mechanism on top of the door.

Figure 55:
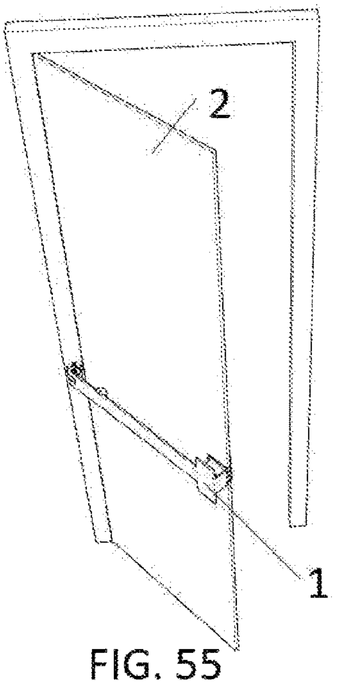
FIG. 55 shows an automatic opening door mechanism which interacts with a handle in the form of a horizontal bar.

FIG. 55 shows a complete automatic door opening mechanism with handle 1 in the form of a horizontal bar. This complete set contains the locking mechanism 108, the door opening mechanism and the bar 1.

Figure 56:
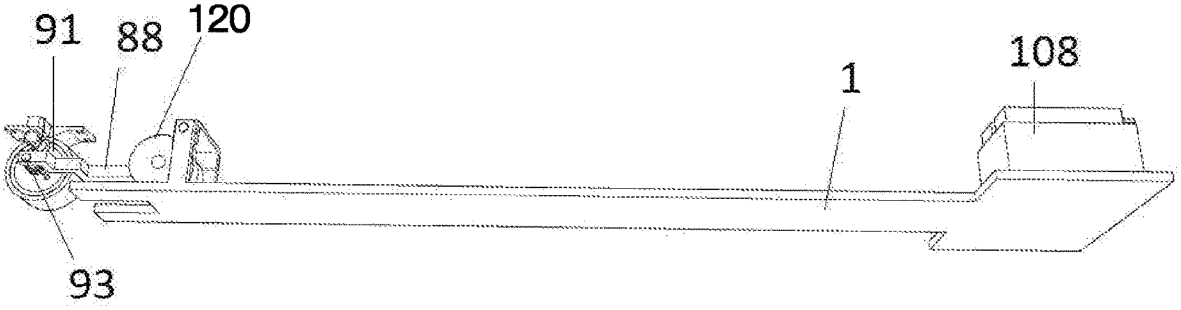
FIG. 56 shows an enlarged view of the horizontal bar in FIG. 55 and related components.

FIG. 56 shows the hydraulic mechanism 93 which moves the arm 88 to open the door 2. At the end of the arm there is a wheel 120 that interacts with the bar 1. The wheel 120 pushes the bar 1 close to its axle and the force is transferred to the door 1 which opens. The wheel 120 is pressed close to the bar's axle so that the torque is high at the axle side and low at the locking mechanism 108 side. A toilet user can use various parts of the body in order to close and open the door 2.

It should be noted at this point that the disclosure of the invention has been made by reference to exemplary embodiments, not being limited thereto. Consequently, any modification or alteration in shape, dimensions, morphology, materials used and manufacturing and assembly components, if they are not a novel inventive step and do not contribute to the technical development of the already known one, are considered to be included in the objectives and in the contemplation of the present invention as summarized in the following claims.

What is claimed is:

1. A contact-minimizing door opening and closing system comprising:

a handle;

a control mechanism coupled to the handle at a first end and coupled to a latch bolt at a second end, the control mechanism being configured to control movement of the handle in response to a position of the latch bolt; and a push-push engaging and disengaging mechanism coupling the handle to a locking pin, actuation of the handle being configured to operate the engaging and disengaging mechanism to lock the door.

2. The contact-minimizing door opening and closing system as in claim 1, wherein the control mechanism is further configured to unlock movement of the handle in response to the latch bolt being compressed into a lock housing by a surface of a strike plate provided on a door frame.

3. The contact-minimizing door opening and closing system as in claim 2, wherein the control mechanism is further configured to lock movement of the handle in response to the latch bolt being ejected from the lock housing by action of a spring member.

4. The contact-minimizing door opening and closing system as in claim 1, wherein the push-push engaging and disengaging mechanism is configured to advance the locking pin into a hole formed on a strike plate provided on a door frame.

5. The contact-minimizing door opening and closing system as in claim 4, wherein the push-push engaging and disengaging mechanism further comprises:

a fixed shell having a cylindrical configuration with a through bore formed coaxially along a central axis of the fixed shell, the fixed shell including a first end configured to slidingly accept the locking pin; and an ejection element configured to slide into a second end of the fixed shell.

6. The contact-minimizing door opening and closing system as in claim 5, wherein the ejection element includes a return spring configured to reset the ejection element to an original position after each actuation of the handle.

7. The contact-minimizing door opening and closing system as in claim 6, wherein the ejection element includes a first end structured to rotationally eject the locking pin, and the locking pin includes a catch structure proximate to the first end of the ejection element, the catch structure being configured to engage with a ridge disposed on an inner surface of the through bore of the fixed shell at first actuations of the handle and disengage from the ridge at second actuations of the handle.

8. The contact-minimizing door opening and closing system as in claim 1, wherein the handle is coupled to the push-push engaging and disengaging mechanism by a double rack and pinion assembly that produces the same movement when the handle is pushed or pulled.

9. The contact-minimizing door opening and closing system as in claim 1, wherein the handle is coupled to the push-push engaging and disengaging mechanism by a worm screw assembly that produces the same movement when the handle is pushed or pulled.

10. The contact-minimizing door opening and closing system as in claim 1, further comprising a door opening assembly configured to bias the door in an open position when the door is unlocked.

11. The contact-minimizing door opening and closing system as in claim 10, wherein the door opening assembly includes spring-loaded hinges.

12. The contact-minimizing door opening and closing system as in claim 10, wherein the door opening assembly includes an hydraulic system configured to open the door when the locking pin is retracted.

13. The contact-minimizing door opening and closing system as in claim 1, wherein the control mechanism is further configured to unlock movement of the handle by unlocking the movement of the locking pin, in response to the latch bolt being compressed into a lock housing by a surface of a strike plate provided on a door frame.

14. The contact-minimizing door opening and closing system as in claim 1, wherein the control mechanism is further configured to lock movement of the handle by locking the movement of the locking pin, in response to the latch bolt being ejected from the lock housing by action of a spring member.

15. The contact-minimizing door opening and closing system as in claim 14, wherein the control mechanism is further configured to store energy produced by movement of the handle to a spring and to release the stored energy to activate the push-push engaging and disengaging mechanism in response to a position of the latch bolt.

16. The contact-minimizing door opening and closing system as in claim 1, further comprising a door opening assembly configured to bias the door in a semi-open position when the door is unlocked.

17. The contact-minimizing door opening and closing system as in claim 1, further comprising a door opening assembly configured to bias the door in a semi-open equilibrium position when the door is unlocked.

18. The contact-minimizing door opening and closing system as in claim 1, further comprising a door opening assembly configured to bias the door to an adjustable open position when the door is unlocked.

19. The contact-minimizing door opening and closing system as in claim 1, wherein the handle includes a shaft with an endplate disposed on the shaft opposite the handle; and wherein the latch bolt includes a pin positioned to contact the endplate, the pin preventing movement of the handle when the latch bolt is extended from a lock housing and allowing movement of the handle when the latch bolt is retracted into the lock housing.

20. The contact minimizing door opening and closing system as in claim 1, wherein the control mechanism is configured to release the locking pin, when the handle is pulled all the away from the door, allowing the locking pin to move freely and be retracted to unlock the door.

21. The contact minimizing door opening and closing system as in claim 1, wherein the door is associated with a room and has an inner side facing an interior of the room and an outer side facing an exterior of the room; and wherein the handle is a single handle of the contact minimizing door opening and closing system located only on the inner side of the door.

22. The contact minimizing door opening and closing system as in claim 21, wherein the handle is configured for undergoing movement along an axis parallel to the inner side of the door.

23. The contact minimizing door opening and closing system as in claim 21, wherein the handle is a flat surface handle placed parallelly to the inner side of the door and is configured to move parallelly to the inner side of the door.

24. A contact minimizing door opening and closing system, comprising: a return mechanism having a first end configured to attach to a fixed surface and a second end mounted on a door, the return mechanism being configured to automatically place the door at a semi-open position when an external force on the door is absent; and a push-push engaging and disengaging mechanism coupling the handle to a locking pin such that movement of the handle is configured to operate the push-push engaging and disengaging mechanism to lock the door.

25. The contact minimizing door opening and closing system as in claim 24, further comprising a control mechanism coupled to a handle at a first end and coupled to a latch bolt at a second end, the control mechanism being configured to control movement of the handle in response to a position of the latch bolt.

26. The contact minimizing door opening and closing system as in claim 24, further comprising a control mechanism coupled to a handle at a first end and coupled to a stopper component at a second end, the control mechanism being configured to control movement of the handle in response to a position of the stopper component.

27. The contact minimizing door opening and closing system as in claim 24, wherein the return mechanism is configured to automatically place the door at the semi-open position set at a preselected, adjustable angle.

28. The contact minimizing door opening and closing system as in claim 24, wherein the semi-open position is an equilibrium position of the door such that when an external force is applied to the door in any direction, the return mechanism is configured to return the door to the equilibrium position.

29. The contact minimizing door opening and closing system as in claim 28, wherein the return mechanism includes a dual action spring configured to return the door to the equilibrium position.

30. The contact minimizing door opening and closing system as in claim 28, further comprising a hydraulic mechanism for regulating the speed of the door when returning to the equilibrium position.

31. The contact minimizing door opening and closing system as in claim 28, further comprising a switch configured to detect removal of the door from the equilibrium position, and configured to activate at least one of lighting, ventilation, deodorant sprayer, and toilet cistern in a room with which the door is associated; wherein when the switch detects that the door has been removed from the equilibrium position, the switch activates the at least one of the lighting, ventilation, deodorant sprayer, and toilet cistern in the room.

32. The contact minimizing door opening and closing system as in claim 24, wherein the return mechanism is connected to a toilet flush located in a room with which the door is associated such that the toilet flush is automatically activated when the door starts to open to the semi-open position.

33. The contact minimizing door opening and closing system as in claim 32, further comprising a cylinder with a plunger connected to the return mechanism by rods, and tubing connected between the cylinder and the toilet flush; wherein when the door starts to open to the semi-open position, the rods push the plunger into the cylinder, causing compressed air to flow through the tubing to automatically activate the toilet flush.

34. The contact minimizing door opening and closing system as in claim 24, wherein the handle is configured for undergoing movement along an axis parallel to the inner side of the door.

35. The contact minimizing door opening and closing system as in claim 24, wherein the handle is a flat surface handle placed parallelly to the inner side of the door and is configured to move parallelly to the inner side of the door.

36. The contact minimizing door opening and closing system as in claim 24, wherein the handle is configured for undergoing rotational movement along an axis parallel to the inner side of the door.

37. A contact-minimizing door opening and closing system comprising:

a handle;

a control mechanism coupled to the handle at a first end and coupled to a stopper component at a second end, the control mechanism being configured to control movement of the handle in response to a position of the stopper component; and a push-push engaging and disengaging mechanism coupling the handle to a locking pin, actuation of the handle being configured to operate the push-push engaging and disengaging mechanism to lock the door.

38. The contact-minimizing door opening and closing system as in claim 37, wherein the control mechanism is further configured to unlock the movement of the locking pin in response to the stopper component being repositioned by striking a surface of a strike plate provided on a door frame.

39. The contact-minimizing door opening and closing system as in claim 37, wherein the control mechanism is further configured to lock movement of the locking pin in response to the stopper component being decompressed from a surface of a strike plate provided on a door frame by action of a spring member.

40. The contact-minimizing door opening and closing system as in claim 37, wherein the push-push engaging and disengaging mechanism is configured to advance the locking pin into a hole formed on a strike plate provided on a door frame.

41. The contact-minimizing door opening and closing system as in claim 37, wherein the handle is coupled to the push-push engaging and disengaging mechanism by a double rack and pinion assembly that produces the same movement when the handle is pushed or pulled.

42. The contact-minimizing door opening and closing system as in claim 37, wherein the control mechanism is further configured to store energy produced by movement of the handle to a spring and to release the stored energy to activate the push-push engaging and disengaging mechanism in response to a position of the stopper component.

43. The contact-minimizing door opening and closing system as in claim 37, further comprising a door opening assembly configured to bias the door in an open position when the door is unlocked.

44. The contact-minimizing door opening and closing system as in claim 43, further comprising a door opening assembly configured to bias the door in a semi-open position when the door is unlocked.

45. The contact-minimizing door opening and closing system as in claim 43, further comprising a door opening assembly configured to bias the door in a semi-open equilibrium position when the door is unlocked.

46. The contact-minimizing door opening and closing system as in claim 43, further comprising a door opening assembly configured to bias the door to an adjustable open position when the door is unlocked.

47. The contact minimizing door opening and closing system as in claim 37, wherein the control mechanism is configured to release the locking pin, when the handle is pulled all the away from the door, allowing the locking pin to move freely and be retracted to unlock the door.

48. The contact minimizing door opening and closing system as in claim 37, wherein the door is associated with a room and has an inner side facing an interior of the room and an outer side facing an exterior of the room; wherein the handle is a single handle of the contact minimizing door opening and closing system located only on the inner side of the door; and wherein the handle is configured for undergoing movement along an axis parallel to the inner side of the door.

49. The contact minimizing door opening and closing system as in claim 37, wherein the handle is a flat surface handle placed parallelly to the inner side of the door and is configured to move parallelly to the inner side of the door.

50. The contact minimizing door opening and closing system as in claim 37, wherein the handle is configured for undergoing rotational movement along an axis parallel to the inner side of the door.

51. A method for locking and unlocking a door with minimal contact, comprising:

providing a door lock having a striker, a locking pin and a push-push engaging and disengaging mechanism coupling a handle to the locking pin;

providing a return mechanism having a first end. attached to a fixed surface and a second end coupled to the door;

compressing the striker against a stake plate mounted to a door frame to unlock a movement of the handle;

extending, by the push-gush engaging and disengaging mechanism, the locking pin into a hole formed on the strike plate in response to the striker being compressed against the strike plate;

retracting, by the push-push engaging and disengaging mechanism, the locking pin from the hole in the strike plate in response to a force exerted on the handle such that the door is placed in an unlocked state; and activating the return mechanism to automatically place the unlocked door in a semi-open position.

52. The method of claim 51, wherein the striker comprises a latch that blocks the movement of the handle.

53. The method of claim 51, wherein the striker comprises a latch that blocks the movement of the locking pin.

54. The method of claim 51, wherein the striker comprises a stopper component that blocks the movement of the locking pin.

55. A method for locking and unlocking a door with minimal contact, comprising:

providing an opening mechanism configured to place the door to a semi open position;

providing a door lock having a locking mechanism, a control mechanism, a handle and a push-push engaging and disengaging mechanism, the control mechanism configuring the handle to move the door to a closed position when a force is exerted at a first step, and the control mechanism configuring the handle to activate, by the push-push engaging and disengagini mechanism, the locking mechanism of the closed door at a second step;

exerting, via the push-push engaging and disengaging mechanism, a force to the handle to place the door at an unlocked state; and activating the opening mechanism to automatically place the unlocked door to a semi-open position.

56. A contact-minimizing door opening and closing system comprising:

a handle;

a control mechanism coupled to the handle at a first end and coupled to a striker at a second end, the control mechanism being configured to control movement of the handle in response to a position of the striker; and a push-push engaging and disengaging mechanism coupling the handle to a locking pin, actuation of the handle being configured to operate the engaging and disengaging mechanism to lock the door.

57. The contact-minimizing door opening and closing system as in claim 56, wherein the striker comprises a latch bolt that blocks the movement of the handle.

58. The contact-minimizing door opening and closing system as in claim 56, wherein the striker comprises a latch bolt that blocks the movement of the locking pin.

59. The contact-minimizing door opening and closing system as in claim 56, wherein the striker comprises a stopper component that blocks the movement of the locking pin.

* * * * *